United States Patent
Roeper et al.

(10) Patent No.: US 12,031,521 B1
(45) Date of Patent: Jul. 9, 2024

(54) BULKHEAD REMOVAL DEVICE AND METHOD

(71) Applicant: FabricAir Canada Inc., Waterloo (CA)

(72) Inventors: Daniela Roeper, Waterloo (CA); Jonathan Parkin, Vancouver (CA); Caner Oktayer, West Babylon, NY (US); Jonathan M. Kuriloff, Saint James, NY (US); John C Senft, IV, Babylon, NY (US)

(73) Assignee: FabricAir Canada Inc., Waterloo (CA)

( * ) Notice: Subject to any disclaimer, the term of this patent is extended or adjusted under 35 U.S.C. 154(b) by 61 days.

(21) Appl. No.: 17/459,422

(22) Filed: Aug. 27, 2021

Related U.S. Application Data

(60) Provisional application No. 63/087,378, filed on Oct. 5, 2020.

(51) Int. Cl.
*F03D 13/30* (2016.01)
*F03D 1/06* (2006.01)

(52) U.S. Cl.
CPC ........... *F03D 13/30* (2016.05); *F03D 1/0675* (2013.01); *F05B 2230/10* (2013.01); *F05B 2230/50* (2013.01); *F05B 2230/80* (2013.01); *F05B 2240/30* (2013.01)

(58) Field of Classification Search
CPC ........ F03D 13/30; F03D 1/0675; F03D 80/40; F05B 2230/10; F05B 2230/50; F05B 2230/80; F05B 2240/30
See application file for complete search history.

(56) References Cited

U.S. PATENT DOCUMENTS

| | | | | |
|---|---|---|---|---|
| 4,494,910 A | * | 1/1985 | Hahn | F03D 1/0675 156/172 |
| 4,686,653 A | * | 8/1987 | Staron | E21B 23/0411 73/152.58 |
| 5,449,047 A | * | 9/1995 | Schivley, Jr. | E21B 44/00 175/27 |
| 5,487,440 A | * | 1/1996 | Seemann | B62D 57/00 180/9.1 |
| 6,112,809 A | * | 9/2000 | Angle | E21B 47/26 175/45 |
| 7,748,476 B2 | * | 7/2010 | Krueger, V | E21B 23/01 166/212 |
| 10,378,508 B2 | * | 8/2019 | Schäfer | F03D 1/0658 |
| 11,415,105 B2 | * | 8/2022 | Schibsbye | B29C 70/682 |
| 2003/0108395 A1 | * | 6/2003 | Douglas | B23Q 9/02 408/76 |
| 2003/0183383 A1 | * | 10/2003 | Guerrero | E21B 17/1021 175/98 |

(Continued)

*Primary Examiner* — David E Sosnowski
*Assistant Examiner* — Wayne A Lambert
(74) *Attorney, Agent, or Firm* — Own Innovation; James W. Hinton

(57) ABSTRACT

A bulkhead removal device is including a bulkhead cutting system for cutting a bulkhead in a wind turbine blade, a positioning system for positioning the bulkhead cutting system, and a deployment assembly for moving the bulkhead cutting system inside the wind turbine blade. A method for cutting a bulkhead inside a wind turbine blade is also provided which includes moving a bulkhead cutting system inside a wind turbine blade, positioning the bulkhead cutting system, and cutting a bulkhead with the bulkhead cutting system.

20 Claims, 25 Drawing Sheets

(56) References Cited

U.S. PATENT DOCUMENTS

| | | | |
|---|---|---|---|
| 2006/0161289 A1* | 7/2006 | Williams | E21D 20/003 |
| | | | 700/177 |
| 2012/0322349 A1* | 12/2012 | Josi | B24B 19/14 |
| | | | 451/73 |
| 2013/0164144 A1* | 6/2013 | Bendel | F03D 80/50 |
| | | | 29/889.7 |
| 2013/0336789 A1* | 12/2013 | Berg | F03D 1/065 |
| | | | 29/889.7 |
| 2015/0148955 A1* | 5/2015 | Chin | B25J 9/162 |
| | | | 901/41 |
| 2016/0052126 A1* | 2/2016 | Chin | B63B 59/10 |
| | | | 427/256 |
| 2017/0114772 A1* | 4/2017 | Neumann | F03D 1/0658 |
| 2017/0191462 A1* | 7/2017 | Garm | F03D 1/0675 |
| 2019/0032491 A1* | 1/2019 | Nissen | B23K 26/342 |
| 2020/0056582 A1* | 2/2020 | Schuring Roelof | F03D 1/0675 |
| 2020/0130078 A1* | 4/2020 | Grishauge | B25B 1/205 |
| 2020/0355160 A1* | 11/2020 | Rogers | F03D 1/0675 |
| 2022/0193797 A1* | 6/2022 | Koike | B23C 1/20 |

* cited by examiner

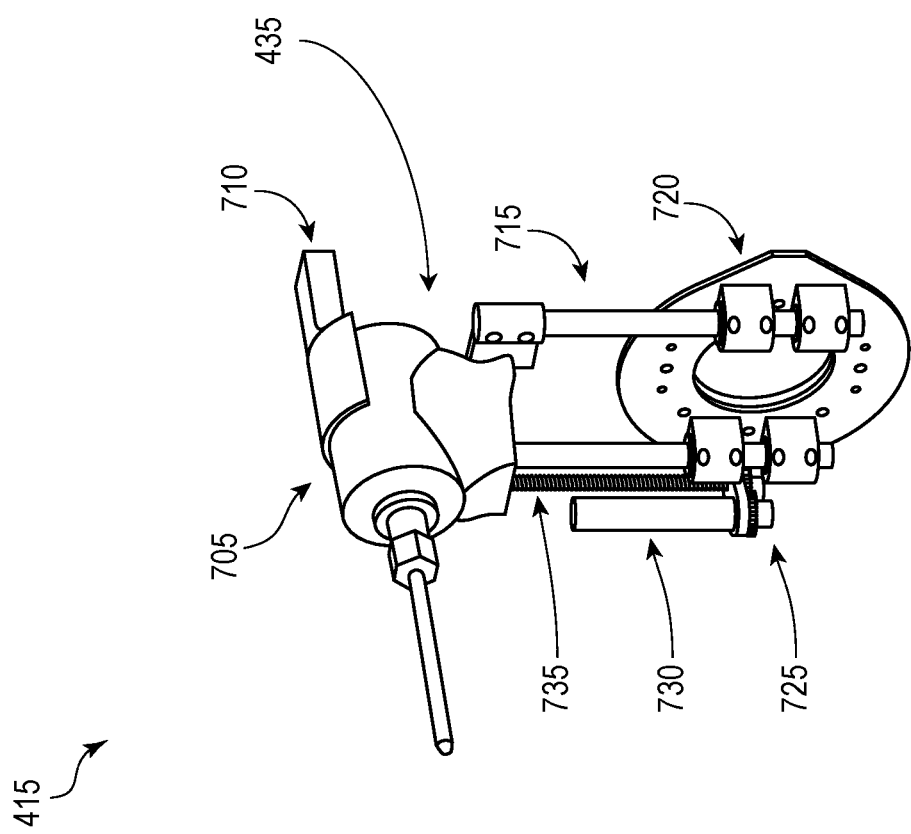

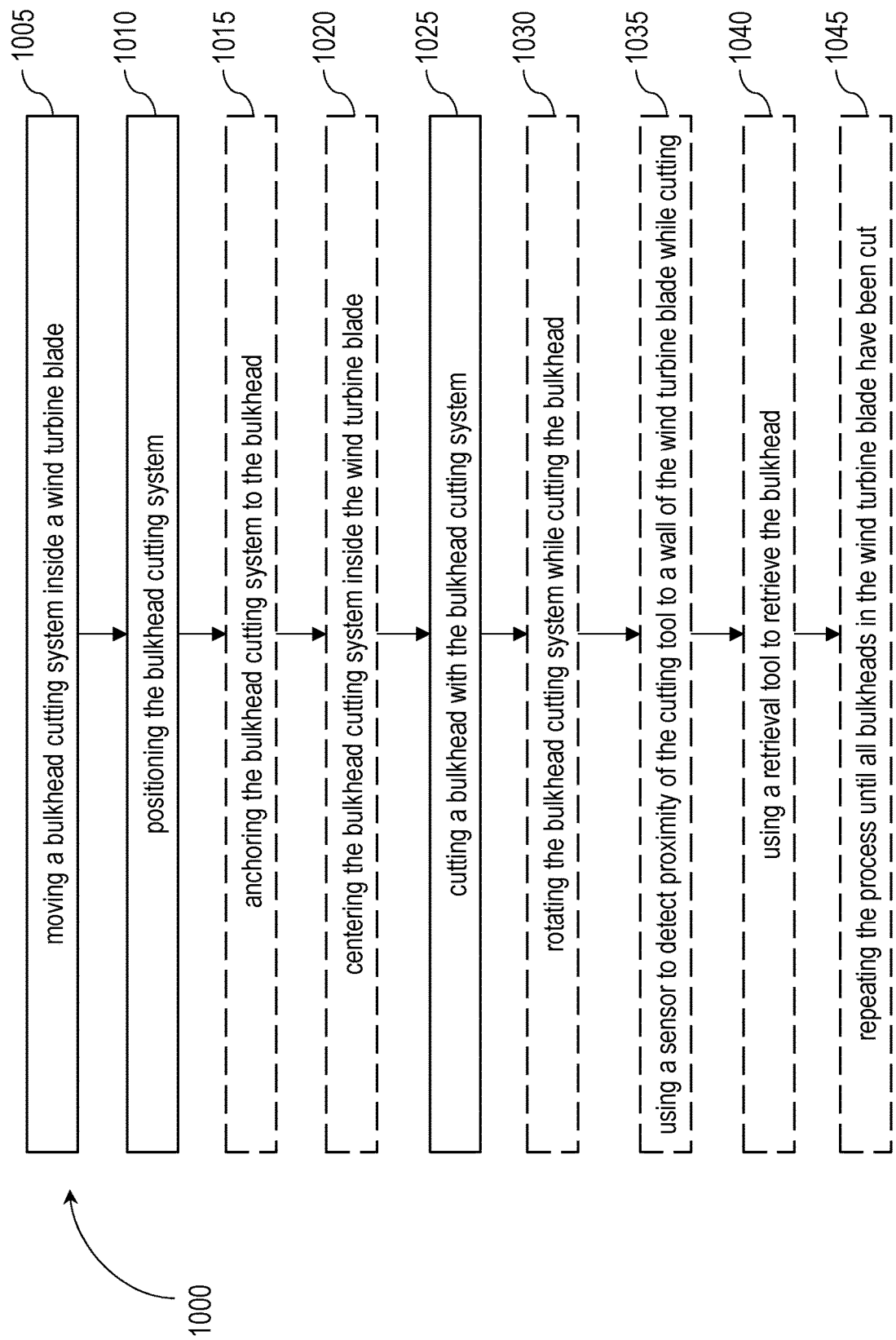

BULKHEAD REMOVAL DEVICE AND METHOD

TECHNICAL FIELD

The embodiments disclosed herein relate to the removal of bulkheads inside a wind turbine blade, and, in particular to devices, apparatuses, and methods of bulkhead removal.

INTRODUCTION

Many windfarms experience severe icing, causing the turbines to be shut down for an extended period of time. In regions of high icing losses, Senvion MM82 and MM92 are common turbines. Depending on the manufacturer of the blades, there are likely bulkheads at several locations spanwise along the wind turbine blade cavities. Bulkheads are foam/fiberglass or wood/fiberglass structures which are independent from the blade. These bulkheads are not structural and only serve a purpose during the lifting of wind turbine blades. In order to install de-icing systems in blades with bulkheads, a pre-installation procedure must be designed and tested in order to remove these obstructions.

De-icing systems gain a significant amount of performance from the ability to distribute hot air to the tip of the wind turbine blade. With the bulkheads in place, a de-icing system is unable to melt ice on the most ice-prone portion of the wind turbine blade. As the de-icing system is designed primarily as a retrofit, it will be necessary for the bulkheads to be removed from the wind turbine blade up-tower, after the blades have been installed.

Accordingly, there is a need for a bulkhead removal system and method that can remove the bulkheads from the leading edge cavity of the blade. It is desirable for as much of the bulkhead to be removed as possible, leaving a relatively smooth edge behind. For example, leaving behind ~1 inch of a cut edge protruding from the perimeter of the leading edge cavity can be acceptable. All of the bulkheads in each blade would need to be removed from each blade prior to the installation of the de-icing systems.

SUMMARY

Provided is a bulkhead removal device which includes a bulkhead cutting system for cutting a bulkhead in a wind turbine blade. The bulkhead removal device also includes a positioning system for positioning the bulkhead cutting system. The bulkhead removal device also includes a deployment assembly for moving the bulkhead cutting system inside the wind turbine blade.

The bulkhead removal device may provide that the deployment assembly includes a pivotally coupled adjustable support member, wherein the adjustable support member can be positioned to brace against a wall inside the wind turbine blade.

The bulkhead removal device may provide that the adjustable support member is tapered to allow for the adjustable support member to collapse when the deployment assembly is pulled out of the wind turbine blade.

The bulkhead removal device may provide that the deployment assembly includes at least one additional support member.

The bulkhead removal device may provide that the deployment assembly includes a rod configured to allow insertion of the bulkhead removal device inside a wind turbine blade.

The bulkhead removal device may provide that the bulkhead cutting system includes a sensor to detect the position of the bulkhead cutting system when cutting the bulkhead.

The bulkhead removal device may provide that the sensor is a sound navigation ranging (SONAR) sensor.

The bulkhead removal device may provide that the sensor is a camera sensor to provide a visual of the position of the bulkhead cutting system when cutting the bulkhead.

The bulkhead removal device may provide that the bulkhead cutting system cuts the bulkhead using a pre-programmed cutting path.

The bulkhead removal device may provide that the bulkhead cutting system includes a motor to turn a cutting tool, a driver to convert voltage into pulses that rotate the motor, and a controller to store programs to run the driver.

The bulkhead removal device may provide that the cutting tool is a spindle powered drill.

The bulkhead removal device may provide that the bulkhead cutting system includes a retrieval tool that is configured to anchor the bulkhead cutting system while cutting and retrieve the bulkhead after cutting is complete.

The bulkhead removal device may provide that the retrieval tool includes at least one of the group comprising an adhesive, a drill, and a suction.

Provided is a bulkhead removal device which includes a tool assembly further comprising a bulkhead cutting system and a positioning system. The bulkhead cutting system is connected to the positioning system. The bulkhead cutting system includes a cutting tool configured to cut a bulkhead. The positioning system is adjustable in size and allows for positioning the bulkhead cutting system to cut the bulkhead. The bulkhead removal device also includes a deployment assembly connected to the tool assembly. The deployment assembly includes a rod configured to allow insertion of the bulkhead removal device inside a wind turbine blade. The deployment assembly also includes a pivotally coupled adjustable support member. The deployment assembly also includes a plurality of one non-adjustable support members. The adjustable support member can be positioned to brace against a wall inside the wind turbine blade. The adjustable and non-adjustable support members centrally position the bulkhead removal device inside the wind blade turbine when the adjustable support member is braced against the wall inside the wind turbine blade.

The bulkhead removal device may provide that the bulkhead cutting system further comprises a sensor to detect the position of the bulkhead cutting system when cutting the bulkhead.

The bulkhead removal device may provide that the sensor is a sound navigation ranging (SONAR) sensor.

Provided is a kit including the bulkhead removal device.

Provided is a method of removing a bulkhead inside a wind turbine blade which includes moving the bulkhead removal device inside a wind turbine blade using the deployment assembly. The method also includes positioning the bulkhead cutting system with the positioning system. The method also includes cutting a bulkhead with the bulkhead cutting system.

The method may provide that the bulkhead removal device is centered inside the wind turbine blade prior to cutting the bulkhead.

Provided is a bulkhead removal method which includes moving a bulkhead cutting system inside a wind turbine blade. The bulkhead removal method includes positioning the bulkhead cutting system. The bulkhead removal method includes cutting a bulkhead with the bulkhead cutting system.

The bulkhead removal method may also include rotating the cutting tool while cutting the bulkhead.

The bulkhead removal method may also include using a retrieval tool to retrieve the bulkhead.

The bulkhead removal method may also provide that the cutting tool is anchored to the bulkhead prior to cutting.

The bulkhead removal method may also provide that a sensor is used to detect proximity of the cutting tool to a wall of the wind turbine blade.

The bulkhead removal method may also provide that the sensor is a camera sensor for providing a visual of the position of the cutting tool while cutting the bulkhead.

The bulkhead removal method may also provide that the sensor is a sound navigation ranging (SONAR) sensor.

The bulkhead removal method may also include cutting the bulkhead using a pre-programmed cutting path.

The bulkhead removal method may also provide that the cutting tool is spindle powered drill.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIG. 7A is a perspective view of the bulkhead cutting system shown in FIG. 1;

FIG. 10 is a flowchart demonstrating an embodiment of a method of removing a bulkhead;

DETAILED DESCRIPTION

Figure 1:
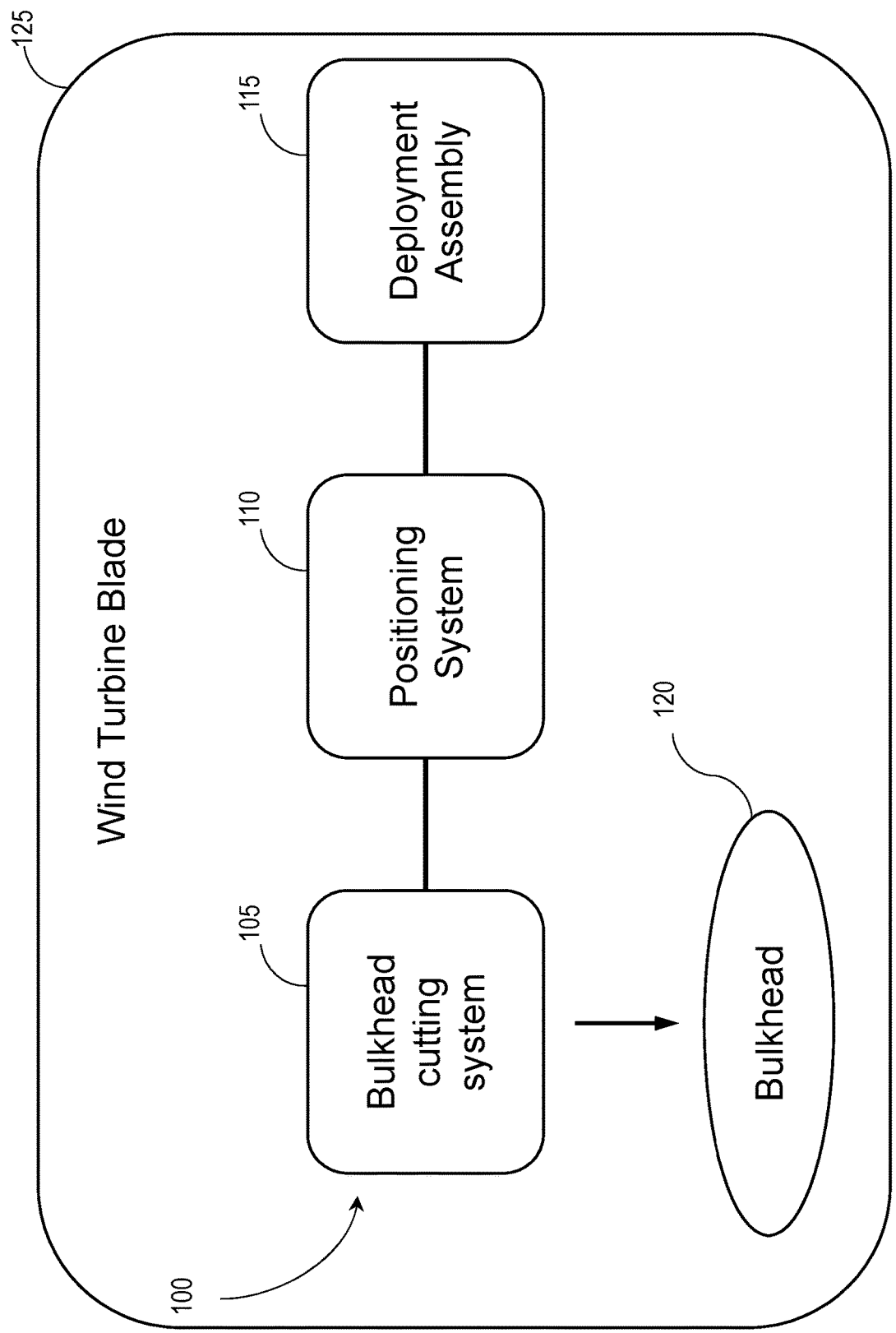
FIG. 1 is a diagram showing a bulkhead removal device, according to one embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The term "bulkhead" refers to structures which are installed into a wind turbine blade during the manufacturing process. Bulkheads are foam/fiberglass or wood/fiberglass structures which are independent from the wind turbine blade. These bulkheads may not be structural during turbine operation and may primarily serve a purpose during the lifting of wind turbine blades. The locations of bulkheads inside wind turbine blades may vary and can be located by tapping along the outside of the wind turbine blade. For example, an MM92 blade may contain five bulkheads, at the first location, the cavity of the wind turbine blade may be rather small and allow for a very restricted range of motion for the blade entrant.

Bulkheads may have a sandwich structure, consisting of a single core layer of structural foam with outer layers of fiberglass. The complete structure may be over 50 mm in diameter. The cores of bulkheads may be made of a closed-cell, cross-linked PVC foam such as a structural PVC core by Gurit. The cores of bulkheads may also possess a polyester fiberglass resin. These bulkheads are typically added to blades to stiffen specific sections of the blade against crushing of the shell—and in particular the leading edge or nose of the blade—during lifting and other transportation operations or during storage. Bulkheads are typically not critical to the structural functioning of the blade during operation. The bulkheads typically are not a load-carrying member and are typically not installed to prevent panel buckling of the shell during operation. The bulkhead features, if the bulkheads were structurally critical, would be considered ribs—chordwise elements of a structure included to provide resistance to panel buckling or to transfer loads between spanwise load-carrying elements. Some types of structures (e.g., most notably aircraft wings) employ such ribs because the skins are extremely thin, however wind turbine blades typically do not incorporate ribs into their structural design and instead incorporate bulkheads.

When cutting holes in these bulkheads, a thin (e.g., >5 mm) periphery of the bulkhead around the interior of the blade shell may be left to avoid causing any damage to the blade shell structure by trying to grind the bulkhead down flush to the skin. Cutting down flush to the skin may occasionally result in nicking the inner layers of the inner skin of the wind turbine blade.

After removing a bulkhead, leading edge supports may be employed to protect the leading edge of the blade outboard in the spanwise areas where these bulkheads are being modified whenever the blade is strapped for lifting or when the blades are supported in stands with the leading edge down. The application of leading edge supports is generally considered good practice, but could be more important after removing bulkheads designed to lessen the need for such precautions. The leading edge supports should be designed to conform to the leading edge shape (for example, can have a wall at least ⅜" (9 mm) thick). The leading edge supports should spread out the load from the straps or stands (for example, can be at least 600 mm (24") long). Extreme care should be exercised to ensure that straps do not slip off the leading edge supports when moving the blades. Alternatively, when supporting the blades in stands, stands with wide (>600 mm) saddles can also be employed without the use of the leading edge supports.

The term "root closeout" refers to the bulkhead that is located within the first 2 m or so of the root of many wind turbine blades. The closeout is typically a large flanged circular panel constructed of fiberglass sandwich core construction that is bonded or otherwise fastened into the interior of the cylindrical portion of the blade root. The panel features a removable hatch through which workers can climb to access the interior of the blade. Not all wind turbine blades have a removable hatch, but many employ the removable hatch primarily to prevent debris and moisture in the blade from falling in to the rotor hub when the blade is parked above the hub. However, in some few blade designs, the closeout can serve a secondary structural function of stiffening the root of the blade against so-called Brazier effects (aka "breathing"). These structural closeout panels are distinguished from the more general variety because the structural closeout panels typically feature thick fiberglass face sheets and are much heavier structures. These root closeout bulkheads should not be modified without performing some engineering to determine their structural significance.

Referring to FIG. 1, illustrated therein is an embodiment of the bulkhead removal device 100. The bulkhead removal device 100 includes a bulkhead cutting system 105, a positioning system 110, and a deployment assembly 115. The bulkhead cutting system 105 is used for cutting a bulkhead 120 in a wind turbine blade 125. The positioning system 110 is used for positioning the bulkhead cutting system 105. The deployment assembly 115 is used for moving the bulkhead cutting system 105 inside the wind turbine blade 125.

Figure 2:
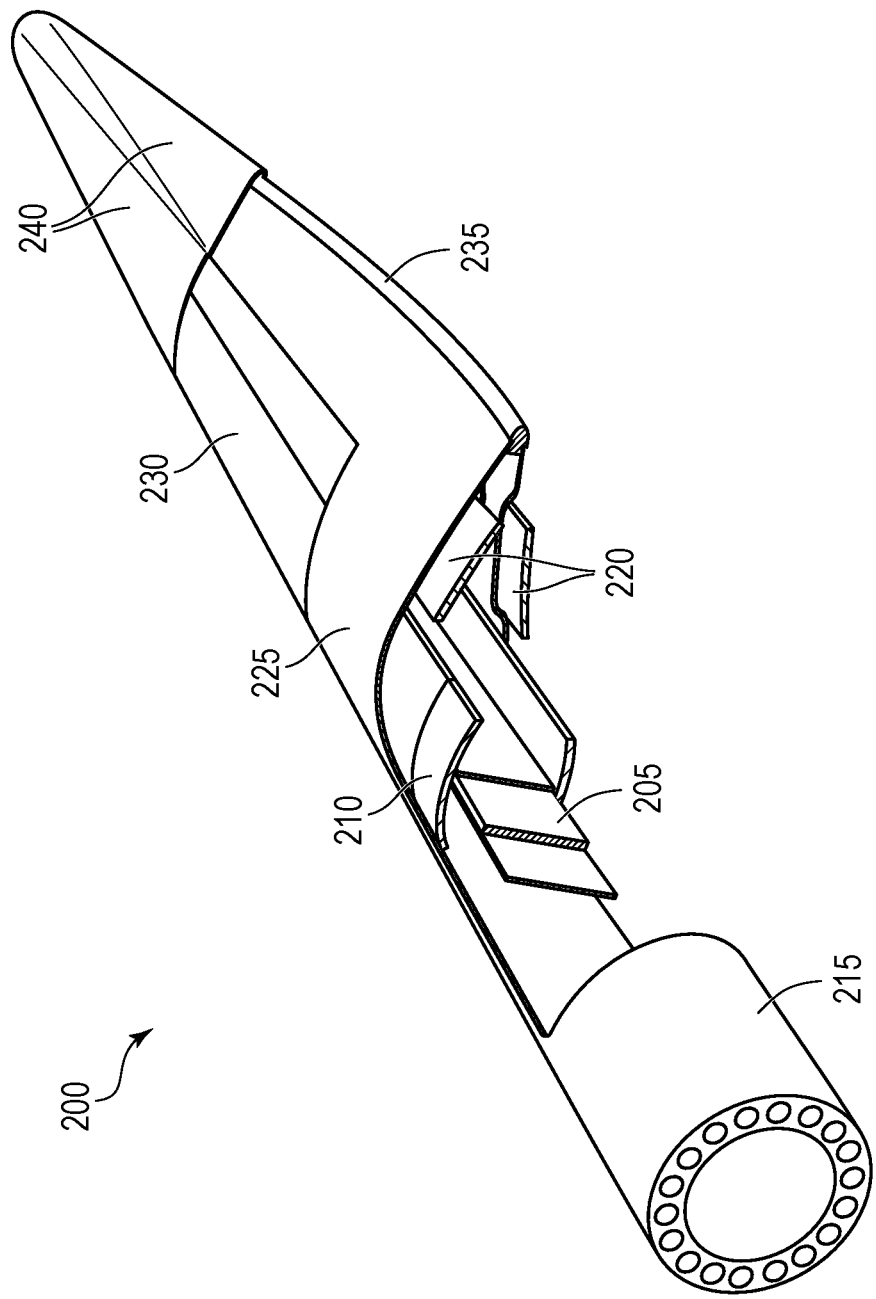
FIG. 2 is a perspective view of the basic structure of a wind turbine blade.

Referring to FIG. 2, the basic structure of a wind turbine blade 200 is shown. The root 215 is the end of the wind turbine blade 200 which attaches to the wind turbine. The spar 210 is a spanwise load-carrying element down the center. The spar 210 is the element that primarily resists the out-of-plane loads acting on a wind turbine blade 200. Wind turbine blades 200 typically feature no chordwise elements as part of the primary structure. The central spar may take on the form of either a box beam with two shear webs 205 or an I-beam with a single web (not shown). A structural adhesive layer 235 attaches the shell 225 to the core 220 and spar 210. The shell 225 is covered by a gel coat 230 and paint 240. Unlike the skins of aircraft wings, the shells 225 of wind turbine blades employ relatively thicker sandwich core construction to resist panel buckling, thereby eliminating the need for ribs. The wind turbine blade 200 has a single-spar construction but the The shells 225 of a wind turbine blade are typically made of lightweight material. It should be recognized that given the very light structure of the shells 225, handling such wind turbine blades 200 could be challenging without some reinforcement of the shells 225 in the lift points. The reinforcement of the shells consists primarily of extra layers of glass added to the exterior of the shells 225 at the lift points, with the fibers oriented in the chordwise direction. In some versions of the wind turbine blade 200, however, contoured blocks of foam are also included in the interior to prevent crushing of the leading edge of the shells during handling. In some versions, the blocks may consist of bulkheads.

Figure 3:
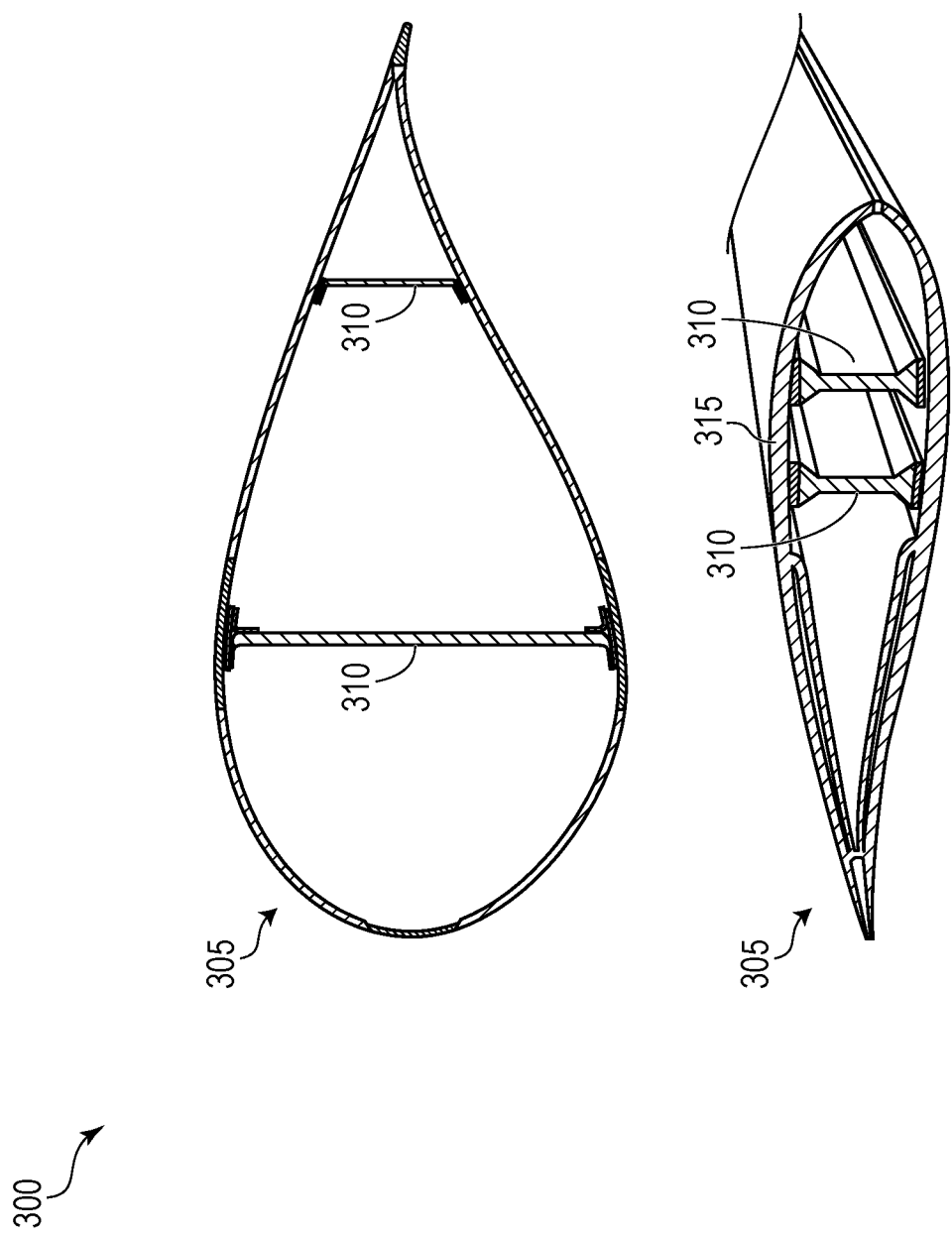
FIG. 3 is a cross-sectional view of adhesively bonded clamshell wind turbine blade structures.

Referring to FIG. 3, an example of an adhesively bonded clamshell 305 wind turbine blade structure is shown. The central I-beam or box-beam spar 315 is not prefabricated as a single element. Instead, the spar caps 310 (sometimes referred to as the spar flanges) are embedded in the blade shells 305, which are then bonded together with one or more prefabricated shear webs to form a blade 300. The combination of the spar caps 310 in the shells 305 adhesively bonded to the shear web(s) forms the effective box beam or I-beam 315. The shells 305 in these designs tend to be rather stiff due to the inclusion of the spar caps 310, and the shells also generally feature rather thick sandwich core construction to prevent buckling of the shells 305. However, outboard on the blade, buckling resistance may not require the use of thick balsa or foam core, and the shells 305—particularly the leading edges—can become quite fragile for purposes of handling. Again, most original equipment manufacturers (OEMs) address the fragility of the shells by adding extra layers of glass with chordwise-oriented fibers to the shells to stiffen them for lifting or by adding internal bulkheads to prevent crushing.

The use of bulkheads provide additional protection for wind turbine blades 300, in case all requirements with respect to the use of protection for the leading edge (and trailing edge for that matter) and proper widths of straps when moving blades are not followed. Riggers will often employ narrow straps without protection, and then the highly concentrated load at the location of the straps can cause crushing or cracking at the strapped location. Similarly, if blades are stored nose down on narrow stands, the loads can also be damaging. If the blades are stored for a long time, plastic creep can cause permanent deformation of the leading edge without other structural damage.

Figure 4:
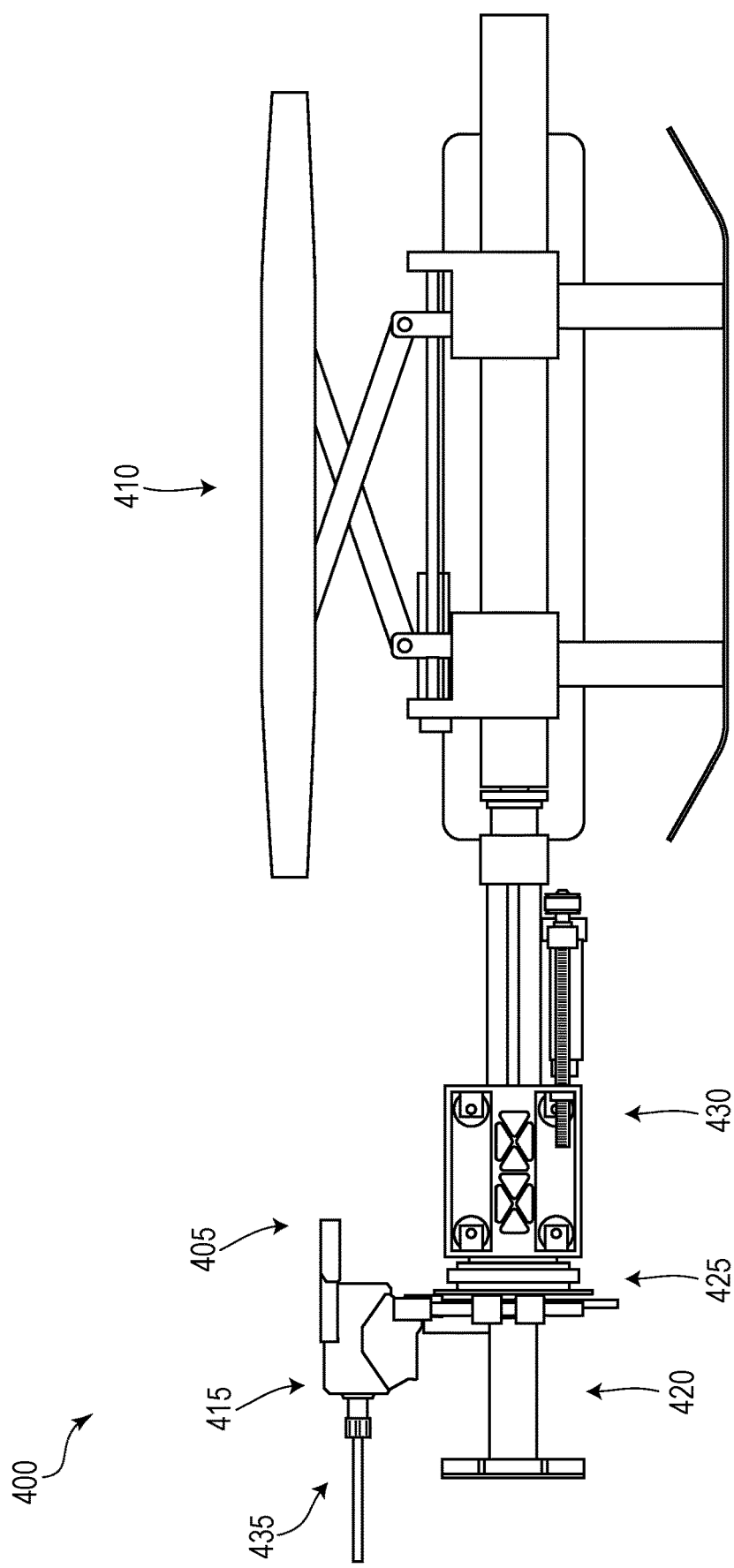
FIG. 4 is a side view of a bulkhead removal device, according to one embodiment.

Referring to FIG. 4, illustrated therein is an embodiment of the bulkhead removal device. The bulkhead removal device 400 includes a deployment assembly 410 for moving the bulkhead removal device inside a wind turbine blade. The bulkhead removal device 400 includes a tool assembly 405 which include components for performing various functions of the bulkhead removal device, which include, without limitation, cutting the bulkhead, retrieving the bulkhead, or rotating a cutting a cutting tool. The tool assembly 405 includes a bulkhead cutting system 415 and a positioning system 430. The bulkhead cutting system is connected to the positioning system 430. The bulkhead cutting system 415 includes a cutting tool 435 configured to cut a bulkhead.

The cutting tool 435 is a spindle powered drill for cutting the bulkhead. In some embodiments, the cutting tool 435 may include, but is not limited to, a hole saw, a quad saw, a oscillating saw, a multi-cutter, a pneumatic endm ill, or a milling spindle. The cutting tool 435 can be applied using various methods that include, but are not limited to, linear servos, screw driven carriages, or rack-and-pinions. The positioning system 430 is adjustable in size and allows for positioning the bulkhead cutting system 415.

In some embodiments, the tool assembly 405 also includes a circumferential sub system 425 and a retrieval device 420. The circumferential sub system 425 is configured to rotate the bulkhead cutting system 415 while cutting the bulkhead. The retrieval device 420 which allows for retrieval of a bulkhead is connected to the circumferential sub system 425. The bulkhead removal device 400 may also include limit switches to detect the limits of travel for each component.

Figure 5:
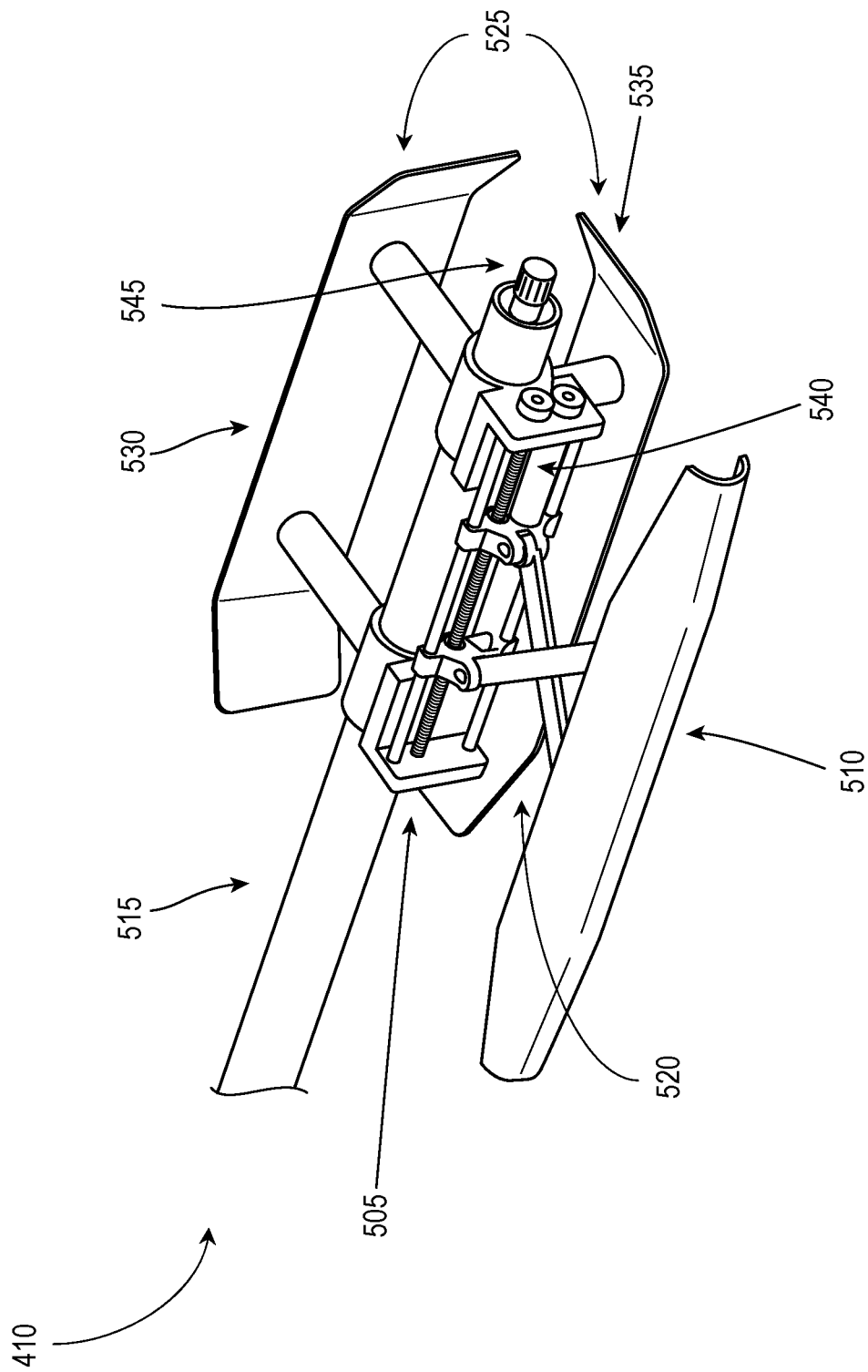
FIG. 5 is a perspective view of the deployment assembly shown in FIG. 1.

Referring to FIG. 5, illustrated therein is an embodiment of the deployment assembly 410 of the bulkhead removal device 400. The deployment assembly 410 allows for moving the bulkhead cutting system 415 inside the wind turbine blade.

The deployment assembly 410 includes a rod 515. The deployment assembly 410 may allow for moving the bulkhead cutting system 415 by pushing the rod 515, to allow insertion of the bulkhead removal device 400 inside a wind turbine blade, the pushrod 515 may also be extendable.

The deployment assembly 410 may, however, allow for moving the bulkhead cutting system 415 by other means. For example, the deployment assembly 410 may be configured with wheels instead of a rod 515 to allow for moving of the bulkhead cutting system 415 inside the wind turbine blade.

The deployment assembly 410 includes additional support members 525. The additional support members 525 include horizontal 530 and vertical 535 manually adjustable skis which are locked into position via pins. In some embodiments, the additional support members 525 may be pinwheels to allow for additional clearance when the system passes through the narrow bulkhead passages. These fixed positions are predetermined and correspond to the appropriate bulkhead size.

The deployment assembly 410 includes an adjustable support member 520. The adjustable support member 520 includes an expanding rail system 505 and a wall press 510. The expanding rail system 505 extends the wall press 510 to the leading edge of the wind turbine blade, locking the system in place. Locking the system in place by extending the wall press 510 allows the adjustable support member 520 to be positioned to brace against a wall inside the wind turbine blade. The expanding rail system 505 is driven by a DC gear drive motor 540 to allow for automatic adjustment of the adjustable support member 520.

In some embodiments, the deployment assembly 410 connects to the tool assembly 405 via a quick connect coupling means 545. The quick connect coupling uses a male and female unthreaded pipe fitting style with two positioning bolts. The male and female pipes may be custom built to have a square profile instead of a round profile. The square profile prevents rotation and misalignment of the quick connect coupling. When the female and male pipes are joined and aligned correctly, the positioning bolts pass through tapped holes in the sides of the female and male pipes to prevent relative axial motion.

Figure 6A:
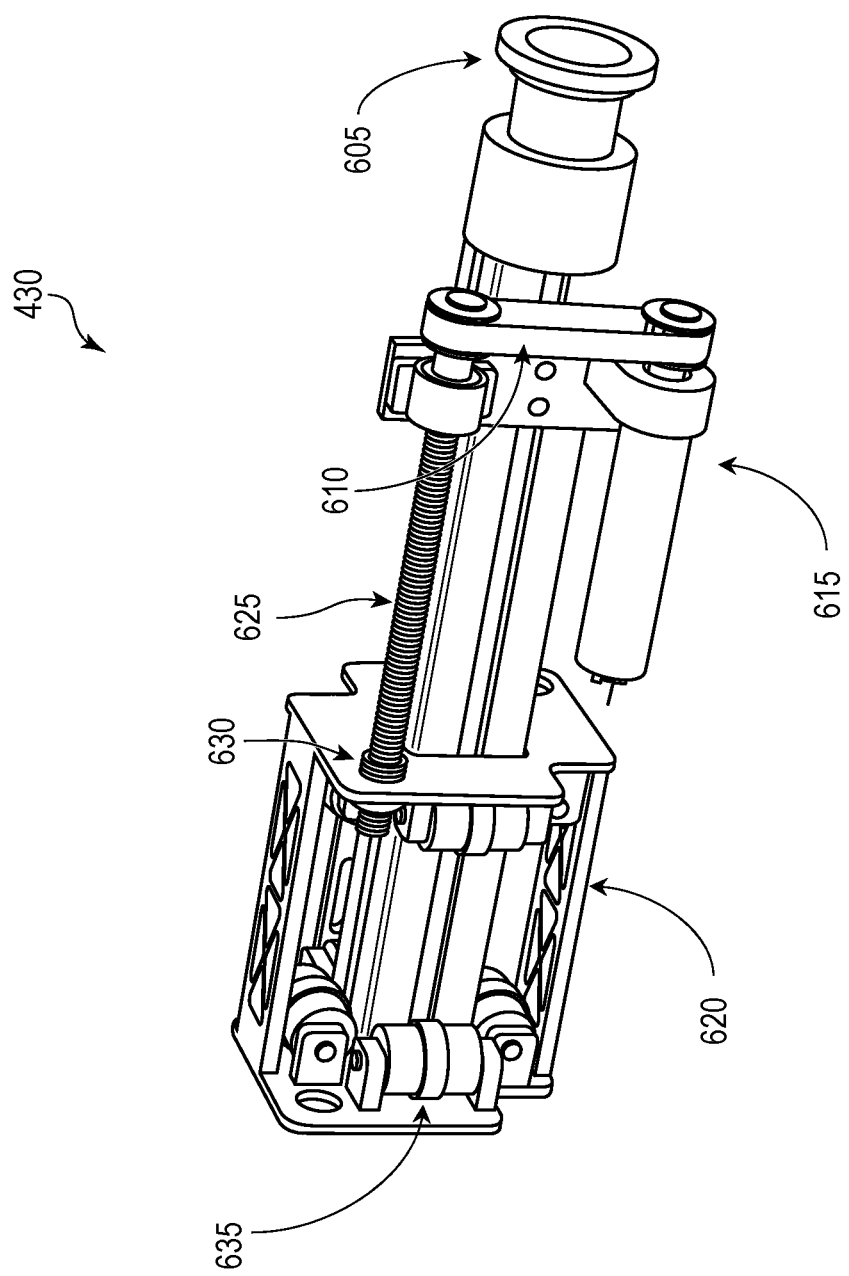
FIG. 6A is a perspective view of the positioning system shown in FIG. 1.

Referring to FIG. 6A, illustrated therein is an embodiment of the positioning system 430 of the bulkhead removal device 400. The positioning system 430 allows for positioning the bulkhead cutting system 415 within the air turbine blade.

The positioning system 430 may include guide rollers 635 which allow for smooth linear motion while positioning the bulkhead cutting system 415. The precision lead screw 625 and nut 630 combination actuate the positioning system 430. The DC gear drive motor 615 paired with a belt drive 610 allows for modulation of the plunge speed.

The quick connect splined couplings 605 connect the positioning system 430 with the deployment assembly 410 and facilitate rapid deployment.

The lightweight cross members and housing 620 provide support for the positioning system 430 and allows for connection of the precision lead screw 625 and nut 630.

Figure 6B:
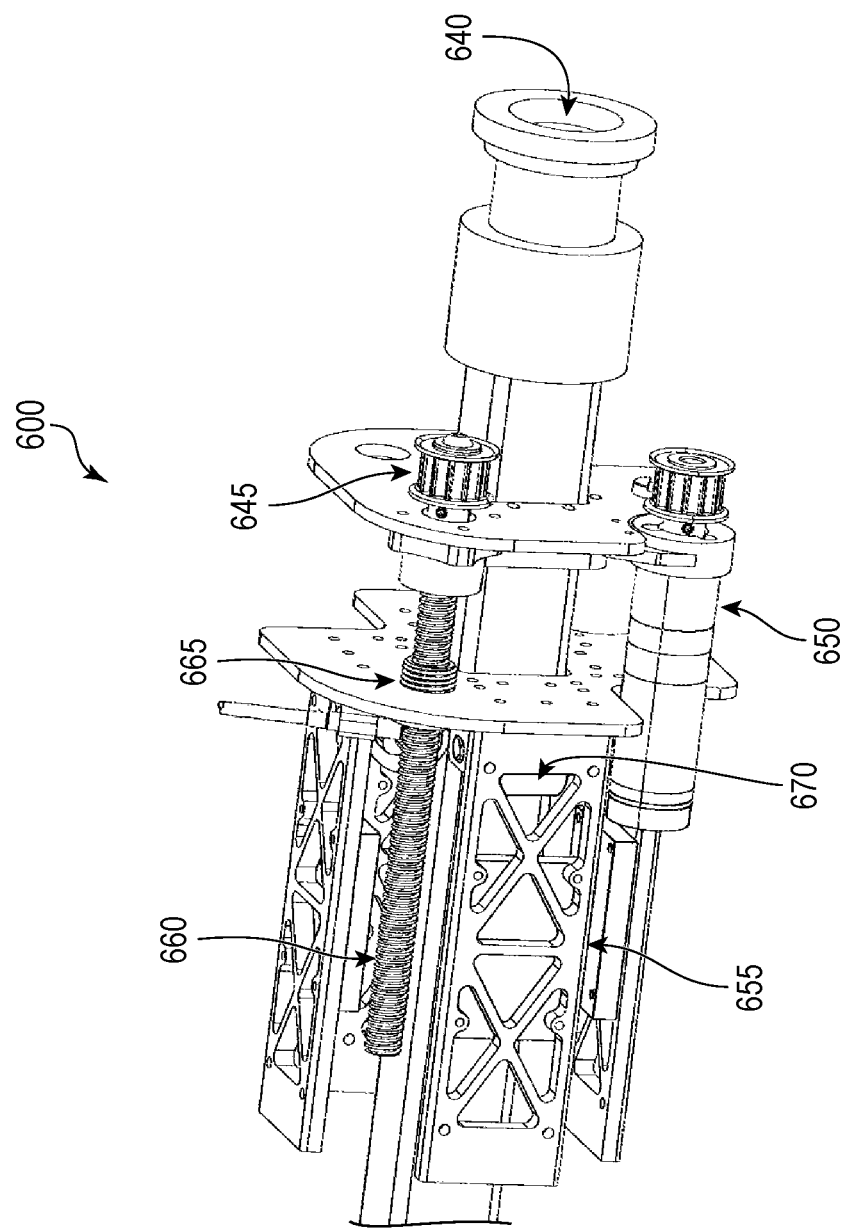
FIG. 6B is a perspective view of the positioning system according to another embodiment.

Referring to FIG. 6B, illustrated therein is another embodiment of the positioning system 600 of the bulkhead removal device. The positioning system 600 allows for positioning the bulkhead cutting system 700.

The positioning system 600 includes guide rollers 670 which allow for smooth linear motion while positioning the bulkhead cutting system 700. The precision lead screw 660 and nut 665 combination actuate the positioning system 600. The DC gear drive motor 650 paired with a belt drive 645 allows for modulation of the plunge speed.

The quick connect splined couplings 640 connect with the deployment assembly and facilitate rapid deployment.

The lightweight cross members and housing 655 provide support for the positioning system 600 and allows for connection of the precision lead screw 660 and nut 665.

Referring to FIGS. 7A, illustrated therein is an embodiment of the bulkhead cutting system 415 of the bulkhead removal device 400. The bulkhead cutting system 415 allows for cutting a bulkhead in a wind turbine blade. The bulkhead cutting system 415 includes a motor 730 to turn a cutting tool 435, a driver to convert voltage into pulses that rotate the motor, and a controller to store programs to run the driver.

In some embodiments, the cutting tool 435 is a spindle powered drill 705, specifically a 300-watt spindle powered drill, however it may also be, but is not limited to, a hole saw, a quad saw, a oscillating saw, a multi-cutter, a burr tool, or a pneumatic endmill.

The motor 730 is a DC gearmotor mated to a geared lead screw 735 which allows for precise linear motion. The linear rails 715 along with the lead screw 735 may be changed out to accommodate different sized bulkheads, the interchangeability allows for maximization of the cutting tool's 435 reach.

The bulkhead cutting system system includes a sensor 710 to detect the position of the bulkhead cutting system when cutting the bulkhead. The sensor 710 will sense the distance of the spindle relative to the blade cavity and maintain a standoff distance. In some embodiments, the sensor 710 is a sound navigation ranging (SONAR) sensor, however, it may also be, but is not limited to, a camera sensor for providing a visual representation of the position of the bulkhead cutting system 415 when cutting the bulkhead, the cutting would thereby be guided manually using the visual representation.

Figure 7B:
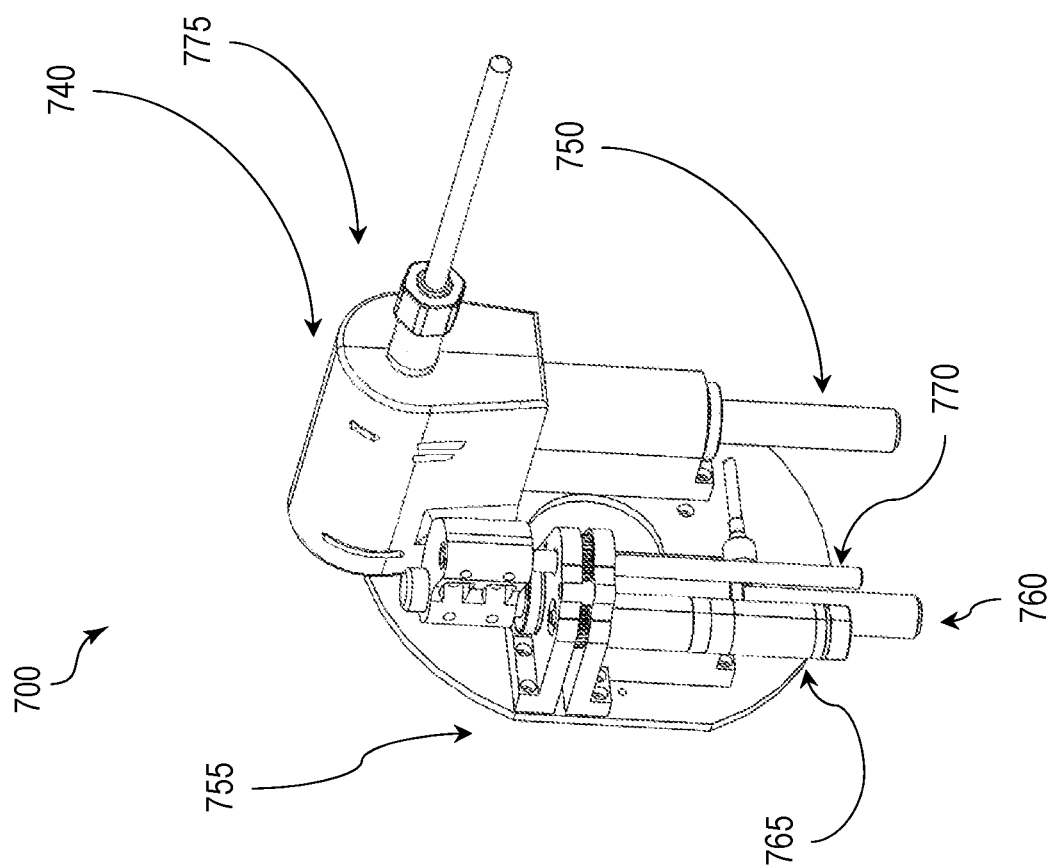
FIG. 7B is a perspective view of the bulkhead cutting system according to another embodiment.

Referring to FIGS. 7B, illustrated therein is another embodiment of the bulkhead cutting system 700 of the bulkhead removal device. The bulkhead cutting system 700 allows for cutting a bulkhead in a wind turbine blade. The bulkhead cutting system 700 includes a motor 765 to turn a cutting tool 775, a driver to convert voltage into pulses that rotate the motor 765, and a controller to store programs to run the driver.

The cutting tool 775 is a spindle powered drill, specifically a 300-watt spindle powered drill 740, however it may also be, but is not limited to, a hole saw, a quad saw, a oscillating saw, a multi-cutter, a burr tool, or a pneumatic endmill.

The motor 765 is a DC gearmotor mated to a geared lead screw 770 which allows for precise linear motion. The linear rails 750 along with the lead screw 770 may be changed out to accommodate different sized bulkheads, the interchangeability allows for maximization of the cutting tool's 775 reach.

The bulkhead cutting system system includes a sensor 745 to detect the position of the bulkhead cutting system when cutting the bulkhead. The sensor 745 will sense the distance of the spindle relative to the blade cavity and maintain a standoff distance. In some embodiments, the sensor 745 is a sound navigation ranging (SONAR) sensor, however, it may also be, but is not limited to, a camera sensor for providing a visual representation of the position of the bulkhead cutting system 700 when cutting the bulkhead, the cutting would thereby be guided manually using the visual representation.

In some embodiments, the bulkhead cutting system 415 may be controlled by a control station with individual controls for each operation. During the cutting process, the system operator will guide the cutting tool 435 using two joysticks; one may be linked to the circumferential motor while the other may control the spindle radial position. Limit switches may be added to stop any overextension of the linear drives in the system. The bulkhead removal device 400 may further comprise a plurality of camera sensors, allowing an operator to observe each step in the bulkhead removal process. These cameras will feed video back to the control station, where the operator can switch through feeds manually.

Figure 8A:
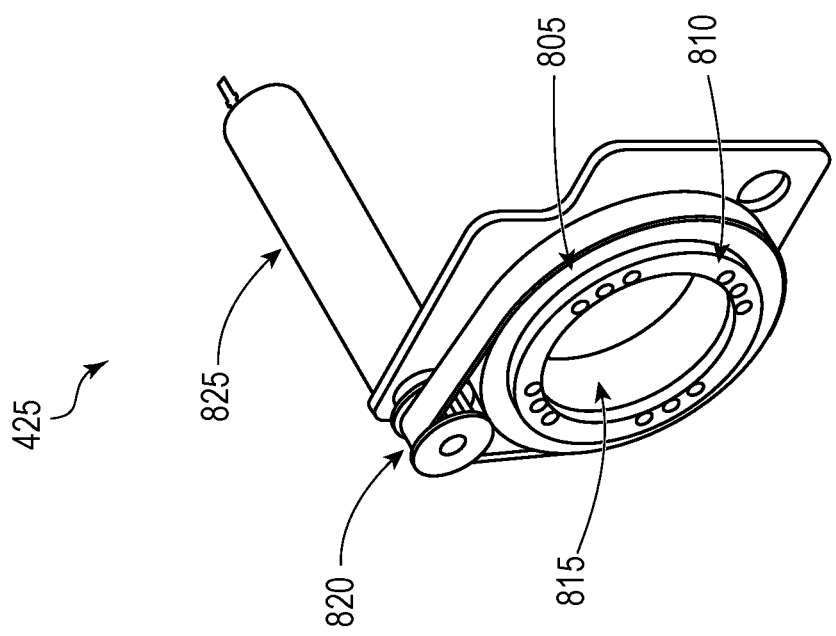
FIG. 8A is a perspective view of the circumferential sub system shown in FIG. 1.

Referring to FIG. 8A, illustrated therein is an embodiment of the circumferential sub system 425 of the bulkhead removal device 400. The circumferential sub system 425 is configured to rotate the bulkhead cutting system 415 while cutting the bulkhead.

The circumferential sub system 425 includes a DC gearmotor 825 paired with a timing belt drive 820 that rotates the drive hub. A drive hub 805 rotates on a wear resistant Delrin bearing 815 with an approximate speed of 0.5 rpm. The drive hub 805 operably connects to the bulkhead cutting system 415. The Delrin retaining ring 810 retains the hub.

Figure 8B:
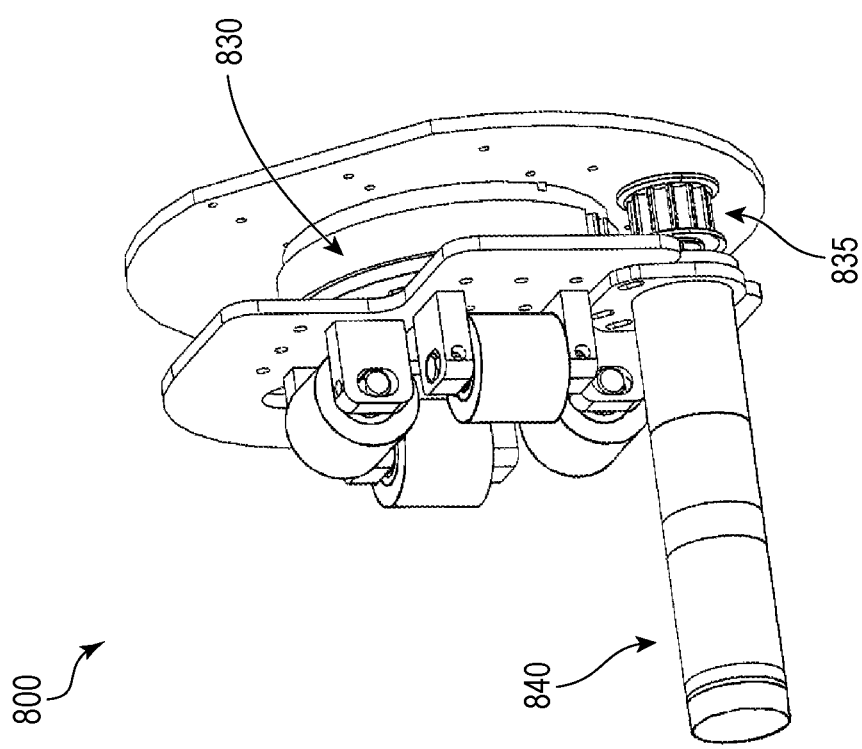
FIG. 8B is a perspective view of the circumferential sub system according to another embodiment.

Referring to FIG. 8B, illustrated therein is another embodiment of the circumferential sub system 800 of the bulkhead removal device 400. The circumferential sub system 800 is configured to rotate the bulkhead cutting system 800 while cutting the bulkhead.

The circumferential sub system 425 includes a DC gearmotor 840 paired with a timing belt drive 835 that rotates the drive hub. A drive hub rotates on a wear resistant Delrin bearing 830 with an approximate speed of 0.5 rpm.

Figure 9A:
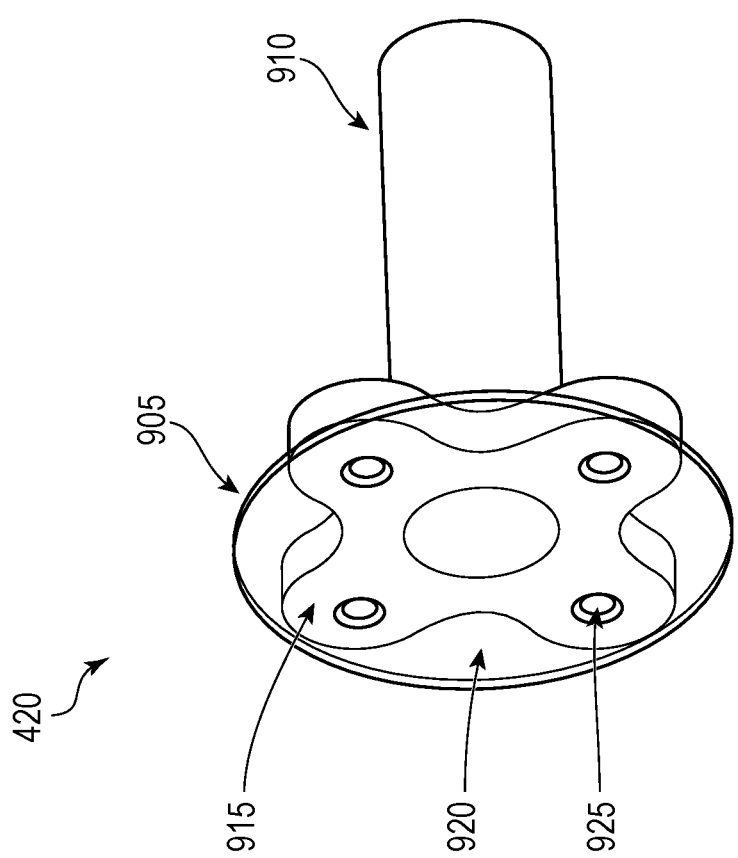
FIG. 9A is a perspective view of the retrieval tool shown in FIG. 1.

Referring to FIG. 9A, illustrated therein is an embodiment of the retrieval tool 420 of the bulkhead removal device 400. During use the retrieval tool 420 is attached to the bulkhead. The retrieval tool 420 is a component of the tool assembly 405 and allows for retrieval of a bulkhead. The retrieval tool 420 may also act as both anchor point during the cutting process and a retrieval point after the cut is completed. In some embodiments, the retrieval tool 420 includes a spine 910, a magnet 915, a prefabricated stamped steel plate 905 with 4 locating detents 925, and a strong adhesive on the surface 920 of the steel plate 905. The spine 910 may be made of, but is not limited to, carbon fiber. After the retrieval tool 420 is retrieved, the stell plate 905 and the adhesively attached bulkhead are removed together, and a new plate 905 will be magnetically attached to the retrieval tool 420. The magnet 915 may be, but is not limited to, a neodymium magnet with a holding force of 24 lbs. A magnet 915 may be present around each locating pin to yield a total holding force of 96 lbs. In some embodiments, the retrieval tool 420 comprises a drill that anchors into the bulkhead. The drill may be able to anchor the retrieval tool 420 at a wider variety of temperatures than the steel plate and adhesive.

Figure 9B:
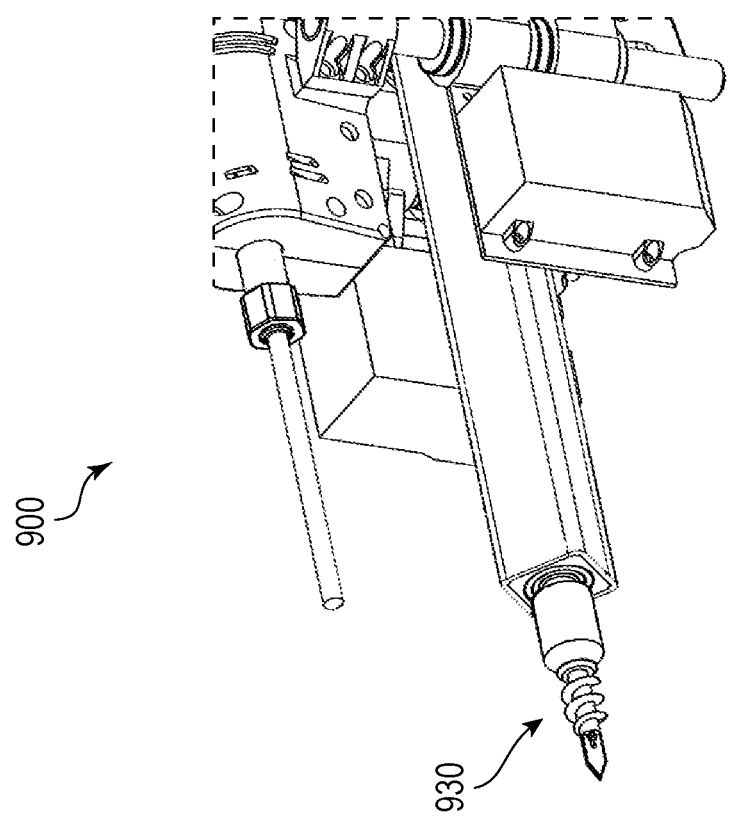
FIG. 9B is a perspective view of the retrieval tool according to another embodiment.

Referring to FIG. 9B, illustrated therein is another embodiment of the retrieval tool 900. The retrieval tool 900 comprises a ¼" quick change hex collet 930. The retrieval tool 900 creates an anchor point during the drilling process by drilling into the bulkhead using the ¼" quick change hex collet 930. The drill point creates a pilot hole, which will be followed by an aggressive screw thread. When bottomed into a bulkhead the screw provides sufficient holding force. The screw geometry may be modified to allow for varying holding force, allowing for emergency extraction.

Referring to FIG. 10, illustrated therein is a flowchart demonstrating an embodiment of a method 1000 of removing a bulkhead. The method 1000 includes, at 1005, moving a bulkhead cutting system inside a wind turbine blade.

The bulkhead cutting system is subsequently positioned, at 1010. The bulkhead cutting system may be positioned such that it is in front of the bulkhead and centered in the wind turbine blade. The positioning may be performed by a positioning system.

The bulkhead cutting system is optionally anchored to the bulkhead, at 1015. A retrieval tool may be used for anchoring the bulkhead cutting system to the bulkhead. The anchor helps stabilize the bulkhead cutting system while cutting.

The bulkhead cutting system is optionally centered inside the wind turbine blade, at 1020. A deployment assembly may be actuated to allow for centering of the bulkhead cutting system by bracing against the walls of the wind turbine blade.

The bulkhead is cut with the bulkhead cutting system, at 1025. The bulkhead cutting system can cut the bulkhead cutting system using a cutting tool. The cutting tool may include, but is not limited to, a spindle powered drill, a hole saw, a quad saw, a oscillating saw, a multi-cutter, a burr tool, or a pneumatic endmill.

The bulkhead cutting system is optionally rotated while cutting the bulkhead, at 1030 is subsequently performed. The bulkhead cutting system may be rotated in such a manner that any closed shape may be formed by the cut out in the bulkhead. The bulkhead cutting system may be rotated with a small clearance from the wall of the wind turbine blade so that the wind turbine blade is not damaged during the cutting of the bulkhead.

A sensor is optionally used to detect proximity of the bulkhead cutting system to a wall of the wind turbine blade while cutting, at 1035. The sensor may be, but is not limited to, a SONAR sensor or a camera sensor.

A retrieval tool is optionally used to retrieve the bulkhead, at 1040. The retrieval tool may be, but is not limited to, an adhesive, a drill, or a suction.

The process is then optionally repeated until all bulkheads in the wind turbine blade have been cut.

Figure 11:
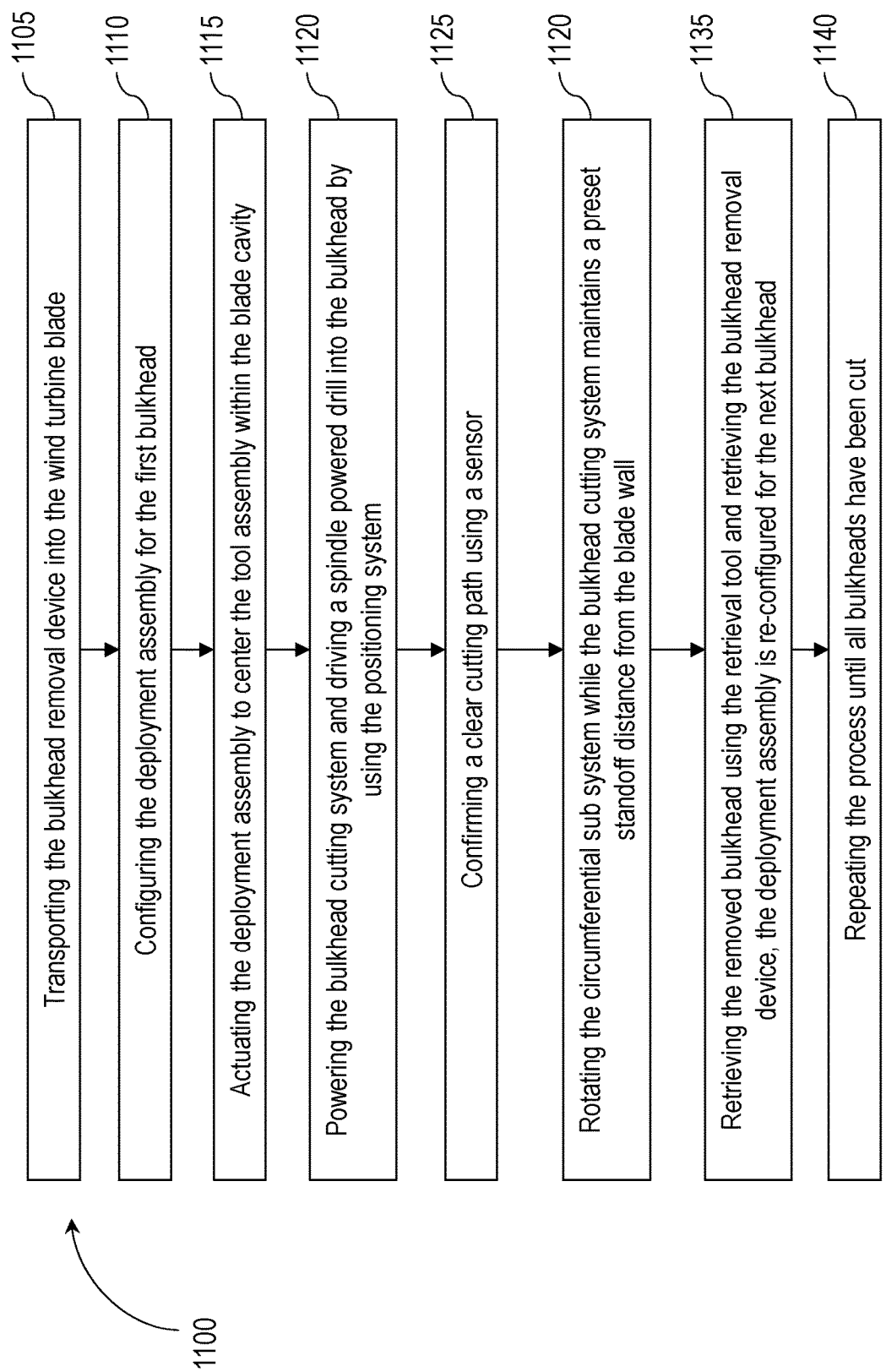
FIG. 11 is a flowchart demonstrating another embodiment of a method of removing a bulkhead.

Referring to FIG. 11, illustrated therein is a flowchart demonstrating an embodiment of a method 1100 removing a bulkhead. The method 1100 includes at 1105 transporting the bulkhead removal device components into the wind turbine blade. The bulkhead is transported by using the deployment assembly. The deployment assembly may include a rod for pushing the bulkhead removal device into the wind turbine blade. In some embodiments, the deployment assembly includes wheels and a motor for transporting the bulkhead removal device into the wind turbine blade.

The deployment assembly is configured for the first bulkhead, at 1110. A bulkhead cutting system is is optionally equipped with a large-diameter burr tool. The burr tool allows for the bulkhead cutting system to cut support brackets and adhesive. The push rods may also be optionally assembled in series to position the bulkhead removal device in front of the first bulkhead.

The deployment assembly is actuated to center the tool assembly within the blade cavity, at 1115. Centering the deployment assembly allows for the easier rotation of a cutting tool of the bulkhead cutting system in order to cut the bulkhead. An anchoring mechanism is optionally drilled into the bulkhead center. The anchoring mechanism helps stabilize the bulkhead cutting system while cutting the bulkhead.

The bulkhead cutting system is powered and a spindle powered drill is driven into the bulkhead by using the positioning system, at 1120. A burr tool is optionally articulated to cut away all near-side protruding support brackets and adhesive. The deployment assembly is optionally collapsed and optionally the anchor and the bulkhead removal device are extracted. Once the bulkhead removal device is extracted the burr tool is optionally swapped for a router tool and the bulkhead removal device is redeployed into the wind turbine blade.

A clear cutting path is confirmed using a sensor, at 1125. In some embodiments, the sensor may be a camera to allow for visual confirmation by an operator remotely accessing the video feed of the camera. In some embodiments the sensor may be a SONAR sensor to detect the distance between the cutting tool and the wall of the wind turbine blade.

The circumferential sub system is rotated while the bulkhead cutting system maintains a preset standoff distance from the blade wall, at 1130. The circumferential subsystem may be a part of the positioning system to allow for rotating the bulkhead cutting system. Rotating the bulkhead cutting system allows for cutting and removal of a single piece of the bulkhead. The bulkhead cutting system is optionally articulated in multiple passes to cut through bulkhead and far-side support bracket and adhesive.

The removed bulkhead is retrieved using the retrieval tool and the bulkhead removal device is also retrieved, at 1135. The deployment assembly is re-configured for the next bulkhead; and repeating the process until all bulkheads have been cut 1140.

Figure 12A:
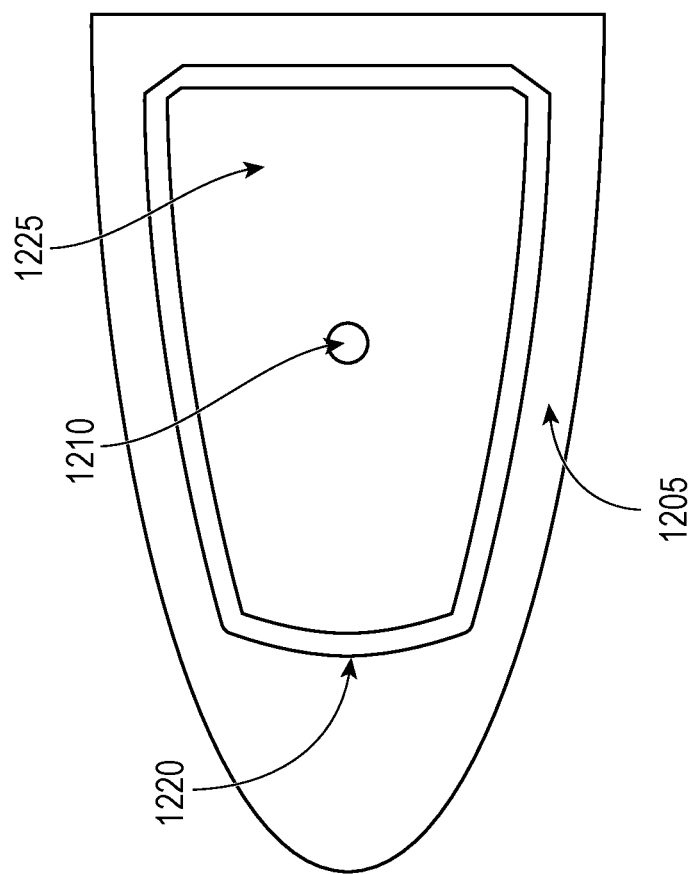
FIG. 12A is a cross-sectional view of a bulkhead inside a wind turbine blade.

Referring to FIG. 12A, illustrated therein is an embodiment of the bulkhead removal device 1200 removing a bulkhead. An example anchoring point 1210 of the retrieval tool 1215 is shown. The anchor point allows for anchoring the bulkhead removal device 1200 The bulkhead cutting system cuts the periphery of the bulkhead leaving a small clearance 1220 in order to avoid cutting into the wall of the wind turbine blade 1205. The interior section of the cut bulkhead 1225 is retrieved from the wind turbine blade 1205. Retrieval of the cut bulkhead cores may be guided visually. A steel plate may be permanently attached to each core; if a core is dropped during the initial retrieval attempt, a secondary magnetic retrieval tool can be attached to the existing pushrods to retrieve the bulkhead.

Figure 12B:
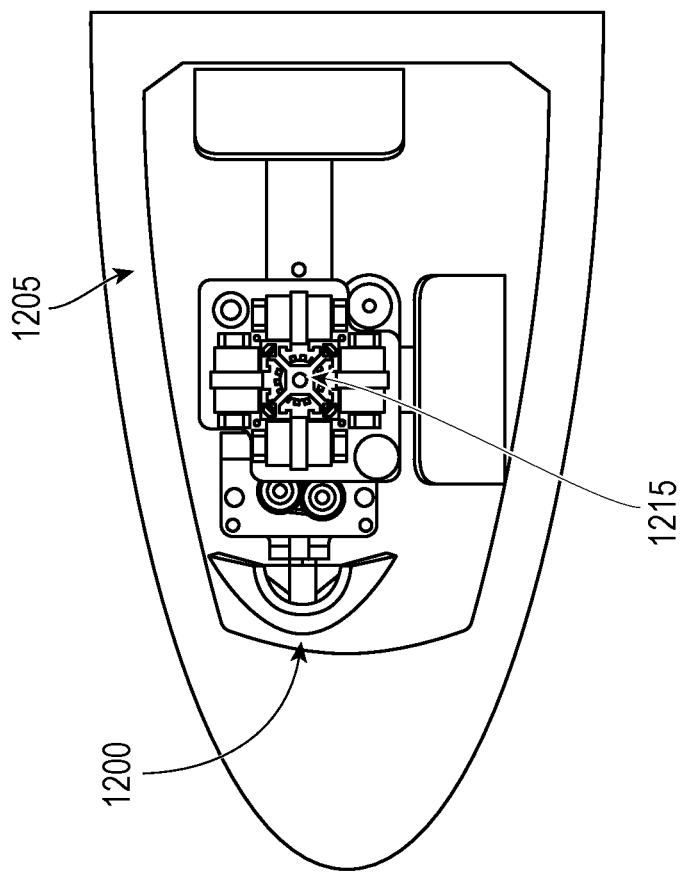
FIG. 12B is a cross-sectional view of a bulkhead removal device travelling through a wind turbine blade.

Referring to FIG. 12B, illustrated therein is an embodiment of a bulkhead removal device 1200 moving through the wind turbine blade 1205. The system can successfully pass through each bulkhead after cutting. Cameras may be deployed to help guide the bulkhead removal device through the bulkheads.

Figure 13A:
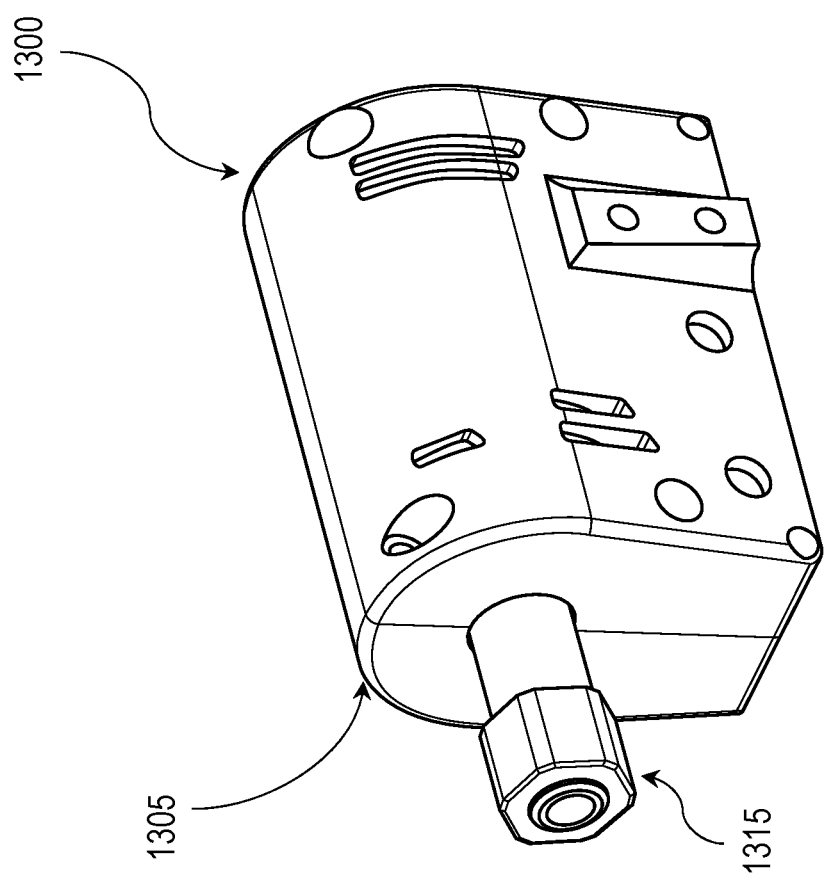
FIG. 13A is a perspective view of another embodiment of the bulkhead cutting system.
Figure 13B:
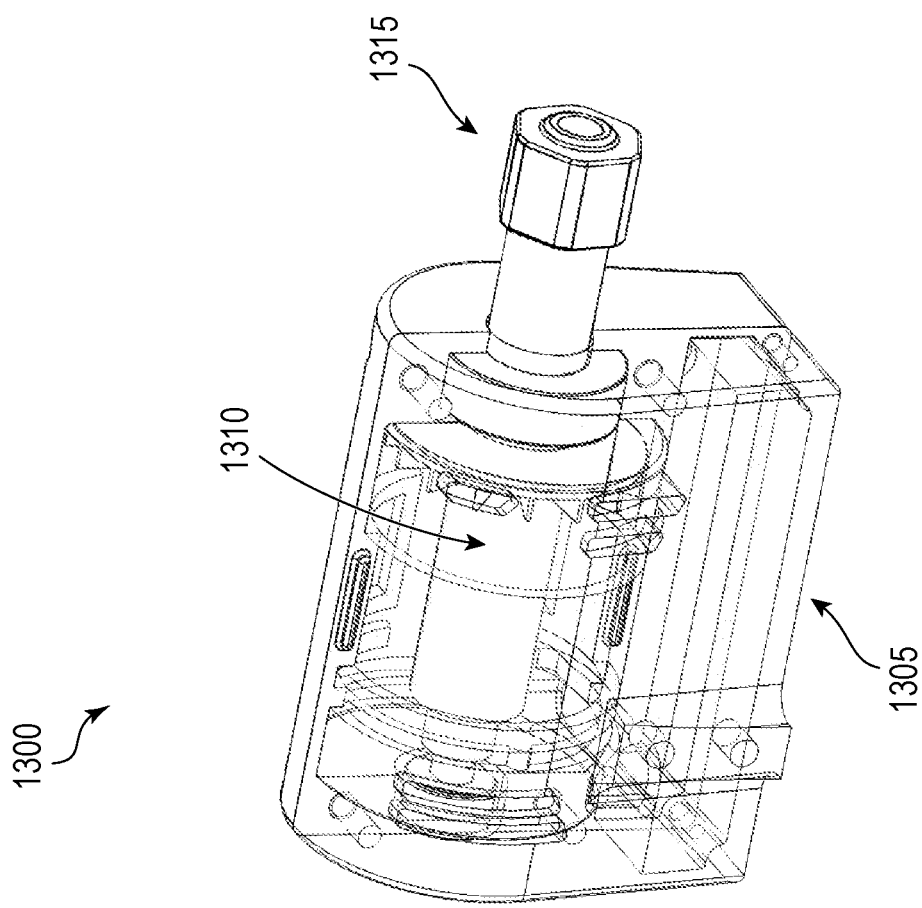
FIG. 13B is a perspective view of the bulkhead cutting system of FIG. 12A with a partially transparent housing.

Referring to FIG. 13A, illustrated therein is a perspective view of another embodiment of the bulkhead cutting system 1300. The bulkhead cutting system 1300 also includes a housing 1305 and a spindle powered tool 1315. FIG. 13B illustrates the same perspective view of the embodiment of the bulkhead cutting system 1300 with a partially transparent housing 1305. The motor housing 1305 may be made of injection molded plastic or CNC machined 6061 with some additional upgrades. In some embodiments, a rear bearing may be replaced to accommodate a much larger load. A preload spring may also be added to increase stability. In the present embodiment, a space is present in the housing to contain the motor driver 1310. The housing possesses increased thermal conductivity due to the CNC machined 6061 housing material, thereby improving efficiency during prolonged use. The housing 1305 possesses mounting surfaces on the sides of the housing, reducing the amount of parts required within the system.

Figure 14:
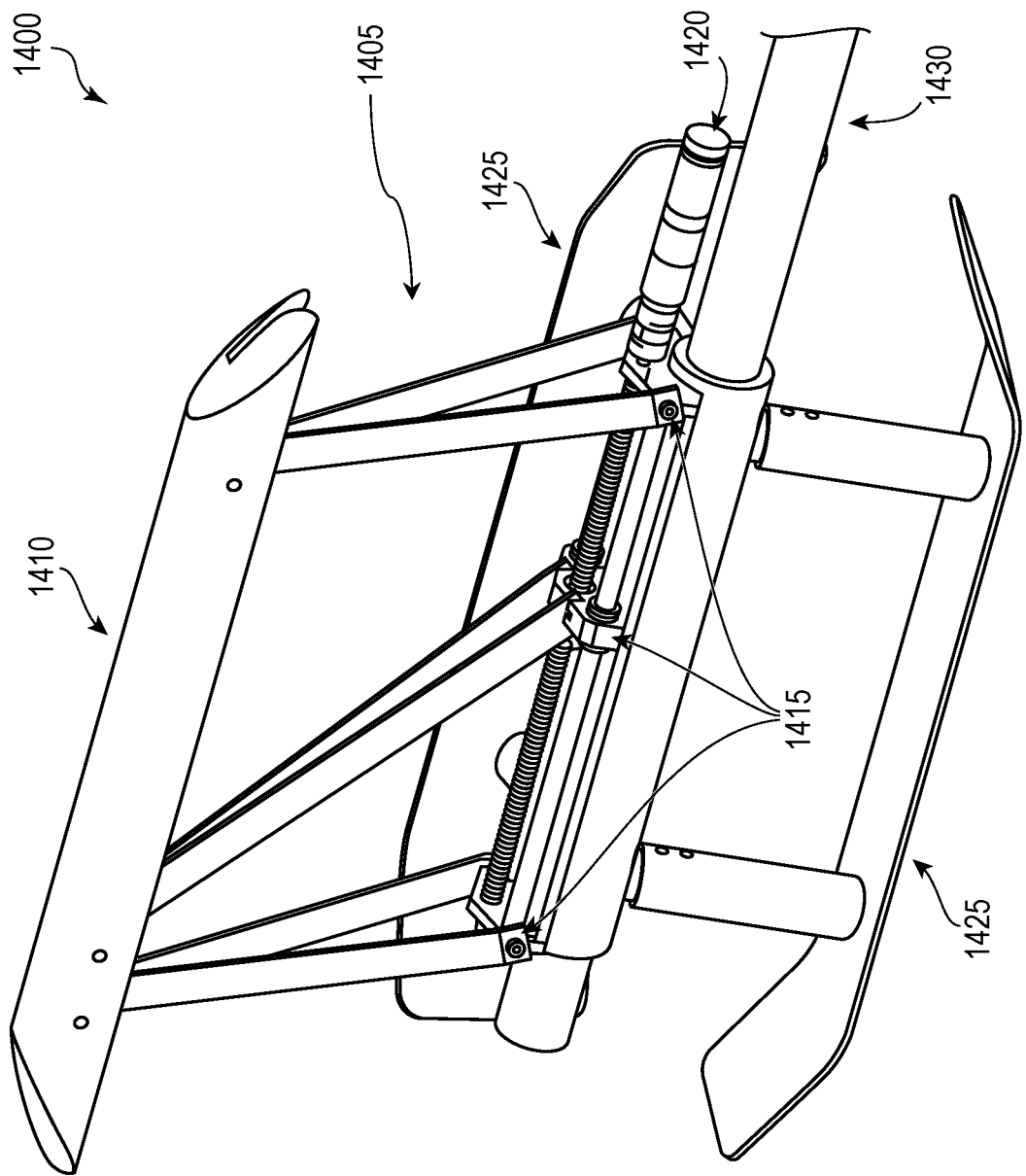
FIG. 14 is a perspective view of the deployment assembly according to another embodiment.

Referring to FIG. 14, illustrated therein is another embodiment of the deployment assembly 1400 of the bulkhead removal device. The deployment assembly 1400 comprises an adjustable support member 1405 which is tapered to allow for the adjustable support member 1405 to collapse when the deployment assembly 1400 is pulled out of the wind turbine blade. The adjustable support member 1405 includes a wall press 1410 which facilitates no-power extraction and allow the deployment assembly 1400 to fit into a smaller clearance envelope.

In some embodiments, the wall press mechanism utilizes a ball screw 1415 that is back-drivable when the motor 1420 driving the ball screw is un-powered. The wall press 1410 is tapered such that pulling the system toward the root of the wind turbine blade will cause the wall press mechanism to fold forward and collapse into a stowed position. The deployment assembly also includes additional support members 1425. The additional support members 1425 include horizontal and vertical manually adjustable skis which are locked into position via pins.

Figure 15A:
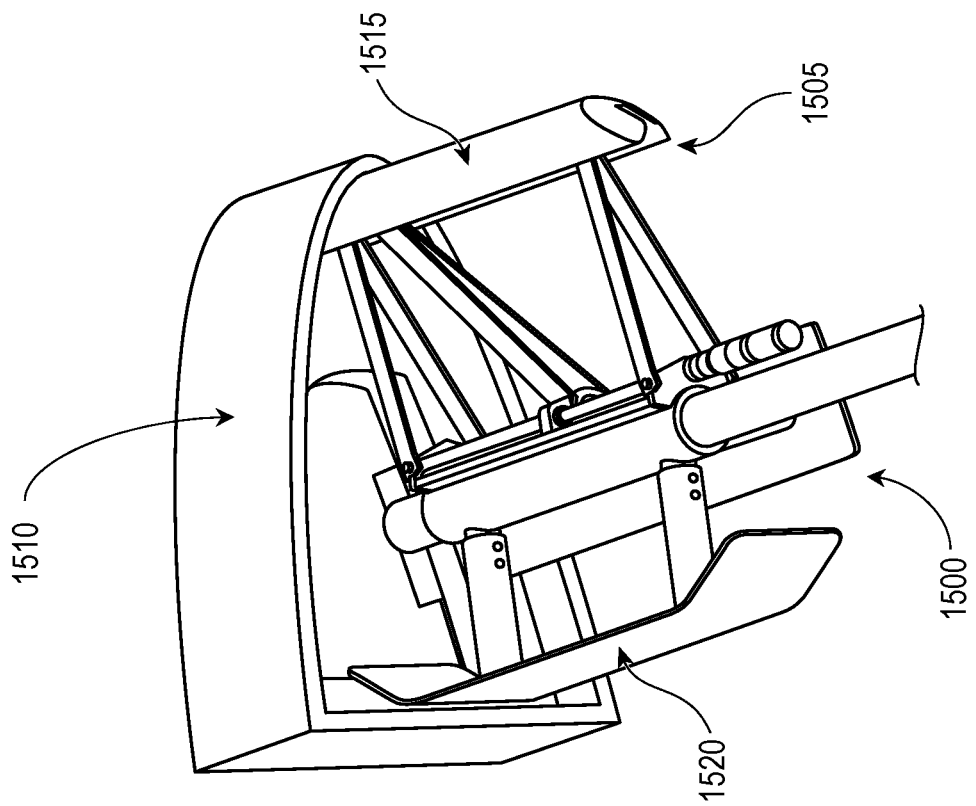
FIG. 15A is a perspective view of the deployment assembly shown in FIG. 13 in a braced position.
Figure 15B:
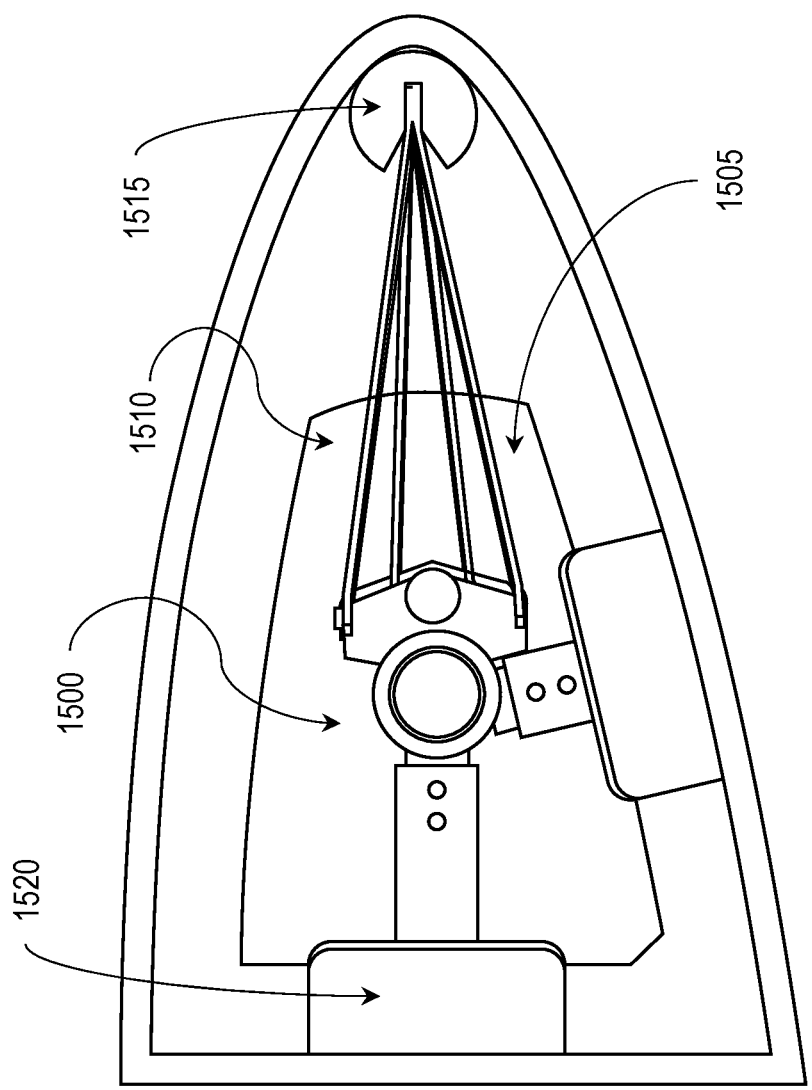
FIG. 15B is a cross-sectional view of the deployment assembly shown in FIG. 13 in a braced position.

Referring to FIGS. 15A and 15B, illustrated therein is another embodiment of the deployment assembly 1500 of the bulkhead removal device in a braced position. FIG. 15A shows the deployment assembly 1500 from a perspective view and FIG. 15B shows the deployment assembly 1500 in a cross-sectional view. The adjustable support member 1505 is positioned to brace against a wall inside the wind turbine blade 1510. The wall press 1515 and additional support members 1520 are positioned such that each of the wall press 1515 and additional support members 1520 make contact against the walls of the wind turbine blade 1510. When the wall press 1515 and additional support members 1520 are contacting against the walls of the wind turbine blade, the deployment assembly 1500 allows for centering the bulkhead removal device in the center of the wind turbine blade 1510.

Figure 16B:
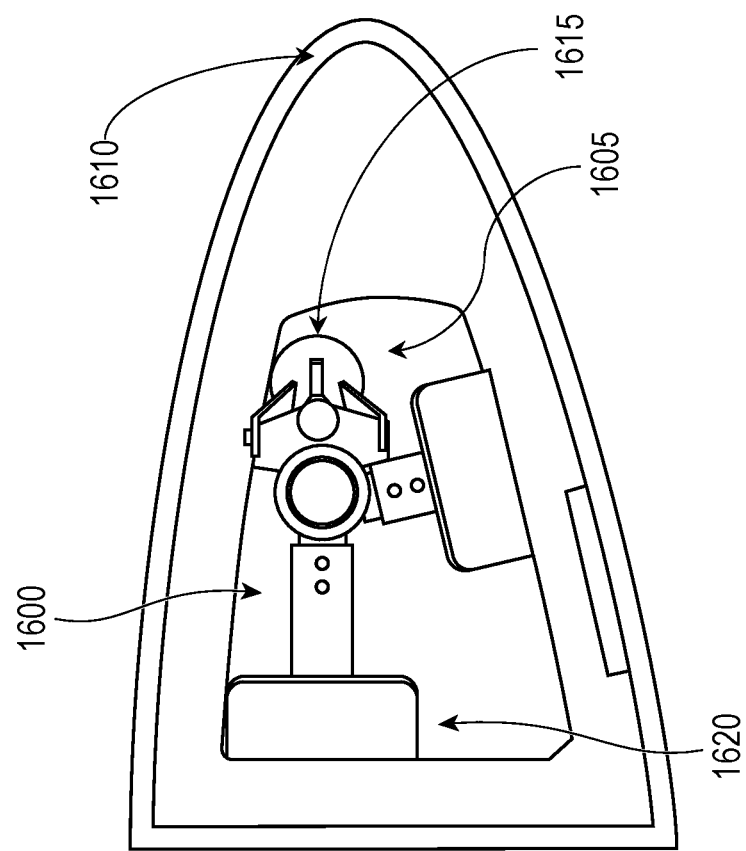
FIG. 16B is a cross-sectional view of the deployment assembly shown in FIG. 13 in a collapsed position.
Figure 16A:
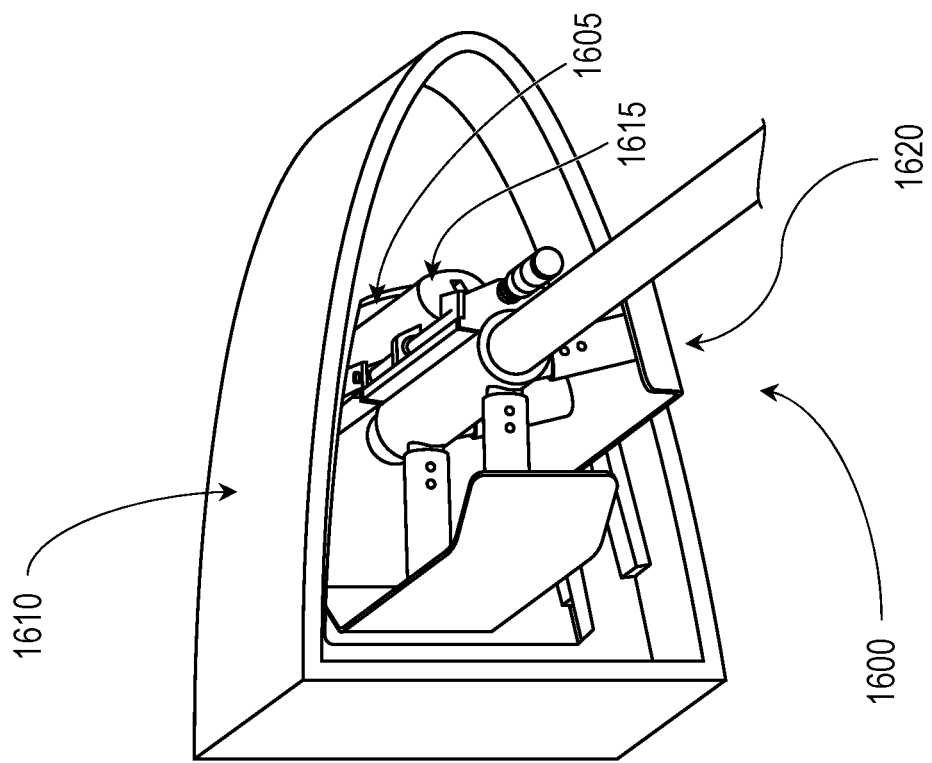
FIG. 16A is a perspective view of the deployment assembly shown in FIG. 13 in a collapsed position.

Referring to FIGS. 16A and 16B, illustrated therein is another embodiment of the deployment assembly 1600 of the bulkhead removal device in a collapsed position. The adjustable support member 1605 is collapsed to allow for clearance of the bulkhead removal device through the wind turbine blade 1610. The adjustable support member 1605 allows the bulkhead removal device to be moved inside the wind turbine blade as it progressively narrows. When in the collapsed position, the bulkhead removal device may be removed from the wind turbine blade or moved further into the wind turbine blade 1610. In the collapsed position, the bulkhead removal device is able to clear through bulkheads which have been cut by the bulkhead cutting system.

Figure 17:
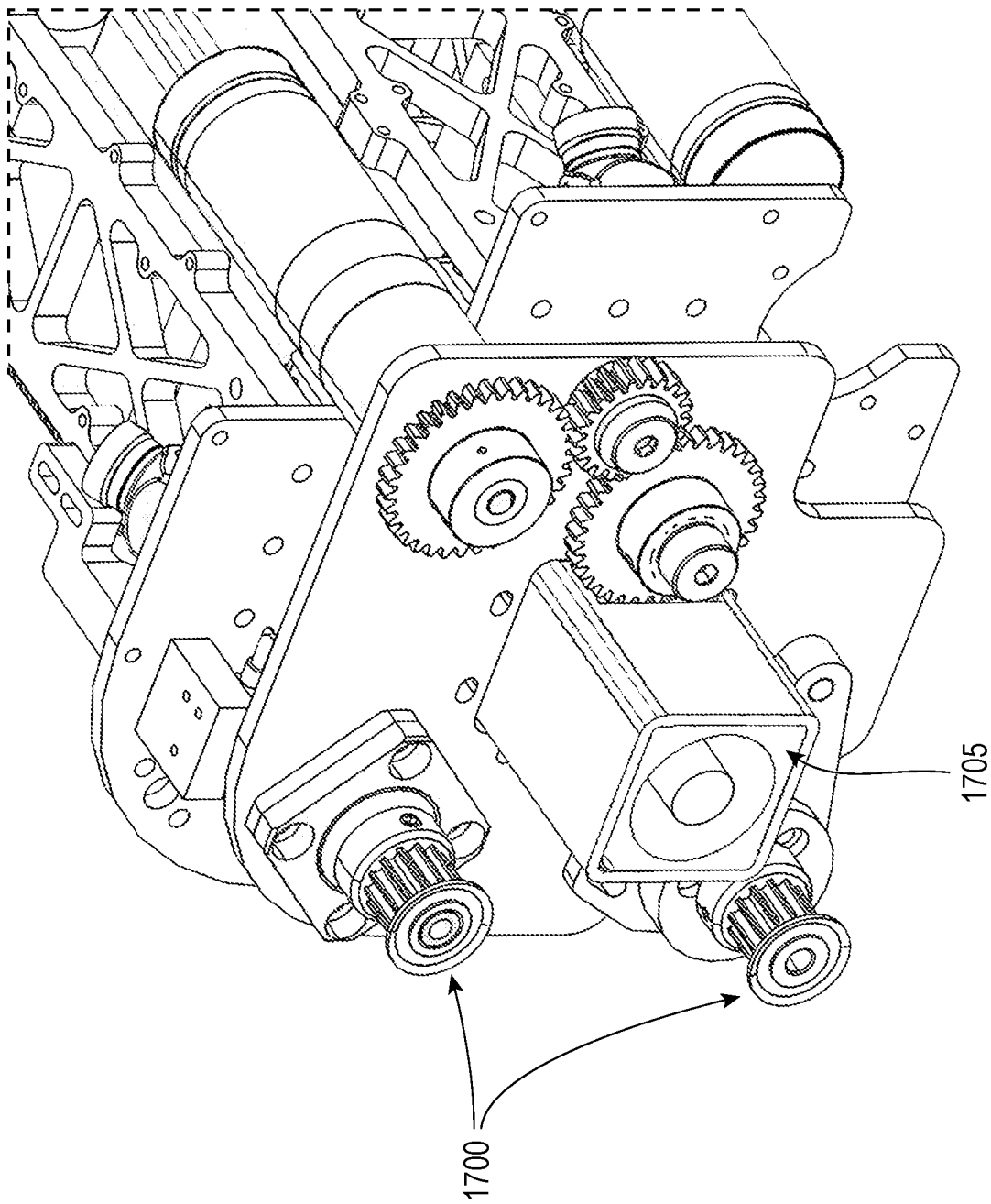
FIG. 17 is a perspective view of is an embodiment of a gear drive in the tool assembly of the bulkhead removal device.

Referring to FIG. 17, illustrated therein is an embodiment of a gear drive 1700 of the tool assembly of the bulkhead removal device. The driveshaft of the drill assembly is housed within the carbon fiber spine of the system. The circumferential assembly is able to move unabated. The gear drive 1700 is configurable allowing for adjustable gear ratios. The center shaft is held by a pair of angular contact bearings, providing both thrust and radial support. The bearing housings 1705 will be mechanically affixed to the carbon fiber spine.

Figure 18:
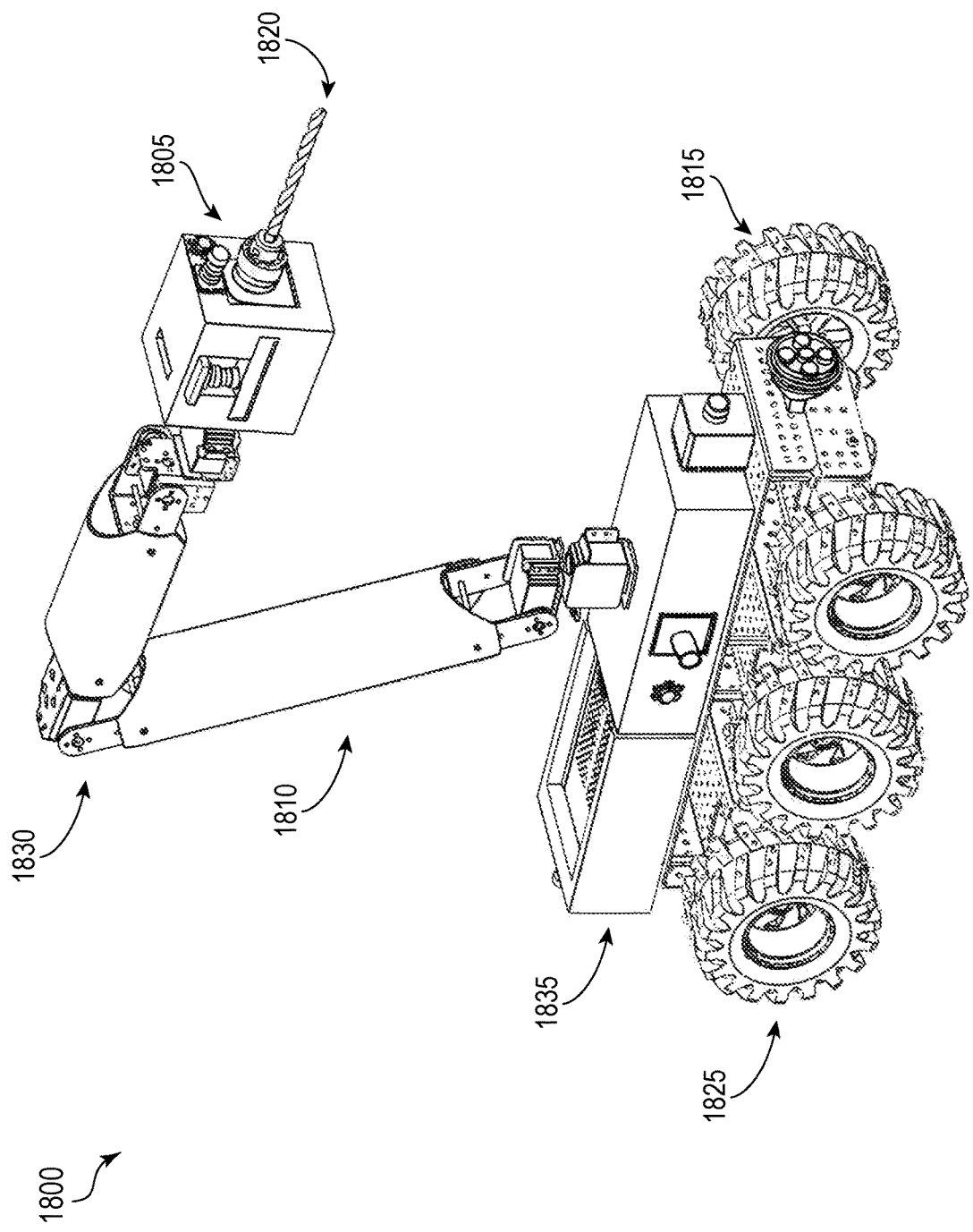
FIG. 18 is a perspective view of the bulkhead removal device according to another embodiment.

Referring to FIG. 18, illustrated therein is another embodiment of the bulkhead removal device 1800. The device includes a bulkhead cutting system 1805, a positioning system 1810, and a deployment assembly 1815. The deployment assembly includes wheels 1825 driven by a motor. The positioning system further includes a robotic arm 1830 for positioning the bulkhead cutting system 1805. The bulkhead cutting system 1805 is interchangeable to allow for different sizes of cutting tools 1820.

In some embodiments, the cutting tool may possess a configuration involving a large tool module, a 300 W spindle motor is used along with a 10 mm drill bit. The device bores through the bulkhead material in a process resembling a milling machine. Due to the requirements of the spindle motor, a constant voltage needs to be supplied. Hence, a power supply unit is installed at the rear and will be connected to an AC power socket available at the top of the wind turbine tower. In addition, the bulkhead removal device carries batteries in baskets conveniently situated underneath the chassis of the bulkhead removal device.

In some embodiments, the cutting tool may possess a configuration using a small tool module, the bulkhead removal device may only use the batteries carried on-board. A 6 mm drill bit is actuated by a high-speed 12V brushless DC motor. The small tool module is designed for trimming bulkheads in spaces as small as 114 mm high and 178 mm wide.

In some embodiments, the bulkhead removal device may have a plurality of camera sensors, optionally five camera sensors providing a 360 degree view of the robot's surroundings and visual feedback from drilling tool's perspective. Also, each camera sensor is accompanied with a 3.4V LED lamp with the exception for the front, which has a LED spot light.

In some embodiments, a suspension system allows for maneuvering over uneven surfaces, which incorporates an individual spring supporting each wheel 1825, thus acting as shock absorbers. The suspension system provides a "cushioning effect" between the chassis 1835 and wheel 1825 when the robot is maneuvering over uneven surfaces while carrying a heavy load. Additionally, the wiring for the power supply unit may require more than ten 3 m extension power cords all connected together. A voltage converter (110V to 220V) is needed as well.

Two 12V Li-ion batteries supply power to the robotic arm 1830, LED lights, FPV cameras, and DC motors. When using the small tool module, one of the batteries is utilized solely for powering the drilling tool.

While the above description provides examples of one or more apparatus, methods, or systems, it will be appreciated that other apparatus, methods, or systems may be within the scope of the claims as interpreted by one of skill in the art.

The invention claimed is:

1. A bulkhead removal device, for removing at least one bulkhead from a wind turbine blade, the device comprising:
   a bulkhead cutting system for cutting at least one bulkhead in a wind turbine blade, wherein the at least one bulkhead is peripherally attached to an interior wall of the wind turbine blade;
   a positioning system, physically connected to the bulkhead cutting system, for positioning a cutting tool of the bulkhead cutting system at the bulkhead; and
   a deployment assembly for moving the bulkhead cutting system inside the wind turbine blades.

2. The bulkhead removal device of claim 1, wherein the deployment assembly further comprises a pivotally coupled adjustable support member, wherein the adjustable support member can be positioned to brace against a wall inside the wind turbine blade.

3. The bulkhead removal device of claim 2, wherein the adjustable support member is tapered to allow for the adjustable support member to collapse when the deployment assembly is pulled out of the wind turbine blade.

4. The bulkhead removal device of claim 1, wherein the deployment assembly further comprises a rod configured to allow insertion of the bulkhead removal device inside a wind turbine blade.

5. The bulkhead removal device of claim 1, wherein the bulkhead cutting system further comprises a sensor to detect the position of the bulkhead cutting system when cutting the bulkhead.

6. The bulkhead removal device of claim 1, wherein the bulkhead cutting system further comprises a motor to turn the cutting tool, a driver to convert voltage into pulses that rotate the motor, and a controller to store programs to run the driver.

7. The bulkhead removal device of claim 1, wherein the bulkhead cutting system further comprises a retrieval tool that is configured to anchor the bulkhead cutting system to the bulkhead while cutting and retrieve the bulkhead after cutting is complete.

8. The bulkhead removal device of claim 7, wherein the retrieval tool comprises at least one of the group comprising an adhesive, a drill, and a suction.

9. A bulkhead removal device, for removing at least one bulkhead peripherally attached to an interior wall of a wind turbine blade, the device comprising:
   a tool assembly further comprising a bulkhead cutting system and a positioning system,
      wherein the bulkhead cutting system is physically connected to the positioning system;
      wherein the bulkhead cutting system further comprises a cutting tool configured to cut a bulkhead;
      wherein the positioning system is adjustable in size and allows for positioning the cutting tool at the bulkhead cutting system to cut the bulkhead; and
   a deployment assembly connected to the tool assembly,
      wherein the deployment assembly comprises a rod configured to allow insertion of the bulkhead removal device inside a wind turbine blade, a pivotally coupled adjustable support member, a plurality of non-adjustable support members, wherein the adjustable support member can be positioned to brace against a wall inside the wind turbine blade and the adjustable and non-adjustable support members centrally position the bulkhead removal device inside the wind turbine blade when the adjustable support member is braced against the wall inside the wind turbine blade.

10. The bulkhead removal device of claim 9 wherein the bulkhead cutting system further comprises a sensor to detect the position of the bulkhead cutting system when cutting the bulkhead.

11. A method of removing a bulkhead inside a wind turbine blade comprising:

moving the bulkhead removal device of claim 1 inside a wind turbine blade using the deployment assembly;

positioning the bulkhead cutting system with the positioning system; and cutting a bulkhead with the bulkhead cutting system.

12. The method of claim 11, wherein the bulkhead removal device is centered inside the wind turbine blade prior to cutting the bulkhead.

13. A bulkhead removal method comprising:

moving the bulkhead cutting system of claim 1 inside a wind turbine blade;

positioning the bulkhead cutting system; and cutting a bulkhead with the cutting tool of the bulkhead cutting system of claim 1.

14. The bulkhead removal method of claim 13 further comprising rotating the cutting tool while cutting the bulkhead.

15. The bulkhead removal method of claim 13 further comprising using a retrieval tool to retrieve the bulkhead.

16. The bulkhead removal method of claim 13, wherein the cutting tool is anchored to the bulkhead prior to cutting.

17. The bulkhead removal method of claim 13, wherein a sensor is used to detect proximity of the cutting tool to a wall of the wind turbine blade.

18. The bulkhead removal method of claim 17, wherein the sensor is a camera sensor for providing a visual of the position of the cutting tool while cutting the bulkhead.

19. The bulkhead removal method of claim 17, wherein the sensor is a sound navigation ranging (SONAR) sensor.

20. The bulkhead removal method of claim 13 further comprising cutting the bulkhead using a pre-programmed cutting path.

\* \* \* \* \*